United States Patent
Luo et al.

(10) Patent No.: US 11,706,167 B2
(45) Date of Patent: Jul. 18, 2023

(54) GENERATING AND ACCESSING VIDEO CONTENT FOR PRODUCTS

(71) Applicant: Snap Inc., Santa Monica, CA (US)

(72) Inventors: Jean Luo, Los Angeles, CA (US); Celia Nicole Mourkogiannis, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 73 days.

(21) Appl. No.: 16/915,785

(22) Filed: Jun. 29, 2020

(65) Prior Publication Data

US 2021/0409356 A1 Dec. 30, 2021

(51) Int. Cl.
| | |
|---|---|
| *H04L 51/046* | (2022.01) |
| *G06Q 30/0601* | (2023.01) |
| *H04L 51/52* | (2022.01) |
| *G06Q 20/38* | (2012.01) |
| *G06F 16/735* | (2019.01) |
| *G06F 16/783* | (2019.01) |

(52) U.S. Cl.
CPC .......... *H04L 51/046* (2013.01); *G06F 16/735* (2019.01); *G06F 16/7837* (2019.01); *G06Q 20/384* (2020.05); *G06Q 20/386* (2020.05); *G06Q 30/0631* (2013.01); *G06Q 30/0643* (2013.01); *H04L 51/52* (2022.05)

(58) Field of Classification Search
CPC ....... H04L 51/046; H04L 51/32; H04L 51/52; G06F 16/7837; G06F 16/735; G06F 20/384; G06F 20/386; G06Q 20/384; G06Q 20/386; G06Q 30/0631; G06Q 30/0643
See application file for complete search history.

(56) References Cited

U.S. PATENT DOCUMENTS

| | | | |
|---|---|---|---|
| 7,254,552 B2 * | 8/2007 | Bezos | G06Q 30/0641 |
| | | | 705/27.1 |
| 7,571,121 B2 * | 8/2009 | Bezos | G06Q 30/0254 |
| | | | 705/26.7 |
| 8,095,432 B1 * | 1/2012 | Berman | G06Q 10/10 |
| | | | 705/26.7 |
| 9,141,656 B1 * | 9/2015 | Lopyrev | G06Q 50/01 |

(Continued)

FOREIGN PATENT DOCUMENTS

| | | |
|---|---|---|
| KR | 20140108499 | 9/2014 |
| KR | 20140146528 | 12/2014 |

(Continued)

OTHER PUBLICATIONS

"International Application Serial No. PCT/US2021/039656, International Search Report dated Oct. 14, 2021", 5 pgs.

(Continued)

*Primary Examiner* — Sargon N Nano
(74) *Attorney, Agent, or Firm* — Schwegman Lundberg & Woessner, P.A.

(57) ABSTRACT

In one or more implementations, video content generated using a client application may be provided to users of the client application in association with one or more products offered for purchase via the client application. Video content items presented to a user may be identified based on a level of interest of the user in relation to the respective video content items. A level of interest of the user in relation to a video content item may be based on profile information of the user.

20 Claims, 12 Drawing Sheets

(56) References Cited

U.S. PATENT DOCUMENTS

| | | | |
|---|---|---|---|
| 9,536,015 B1* | 1/2017 | Kulick | G06Q 30/0201 |
| 10,817,564 B1* | 10/2020 | Harris | G06F 16/9535 |
| 11,288,310 B2* | 3/2022 | Al Majid | G06F 3/016 |
| 11,416,714 B2* | 8/2022 | Smith | G06F 40/211 |
| 2012/0197750 A1* | 8/2012 | Batra | G06F 16/9024 |
| | | | 705/26.7 |
| 2014/0040067 A1 | 2/2014 | England et al. | |
| 2016/0154884 A1* | 6/2016 | Belov | G06F 16/50 |
| | | | 707/770 |
| 2019/0268650 A1* | 8/2019 | Avedissian | G06F 3/0481 |
| 2019/0332785 A1 | 10/2019 | Athulurutirumala | |
| 2020/0327378 A1* | 10/2020 | Smith | G06V 40/20 |
| 2021/0090449 A1* | 3/2021 | Smith | G06N 7/023 |
| 2021/0158371 A1* | 5/2021 | Dhotey | G06Q 30/018 |
| 2022/0100336 A1* | 3/2022 | Luo | G06F 3/0481 |
| 2022/0101361 A1* | 3/2022 | Drummond | G06Q 30/0218 |
| 2022/0101416 A1* | 3/2022 | Boscolo | G06Q 30/0603 |
| 2022/0329909 A1* | 10/2022 | Ramirez Juan | H04N 21/6547 |
| 2022/0343119 A1* | 10/2022 | Smith | G06N 5/048 |

FOREIGN PATENT DOCUMENTS

| | | |
|---|---|---|
| KR | 20180107630 | 10/2018 |
| WO | 2022006138 | 1/2022 |

OTHER PUBLICATIONS

"International Application Serial No. PCT/US2021/039656, Written Opinion dated Oct. 14, 2021", 4 pgs.

"International Application Serial No. PCT/US2021/039656, International Preliminary Report on Patentability dated Jan. 12, 2023", 6 pgs.

* cited by examiner

GENERATING AND ACCESSING VIDEO CONTENT FOR PRODUCTS

BACKGROUND

Applications executed by client devices may be used to generate content. For example, client applications may be used to generate messaging content, image content, video content, audio content, media overlays, documents, creative works, combinations thereof, and the like. In various situations, content related to products offered for sale may be accessible via one or more client applications.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some implementations are illustrated by way of example, and not limitation.

DETAILED DESCRIPTION

Figure 1:
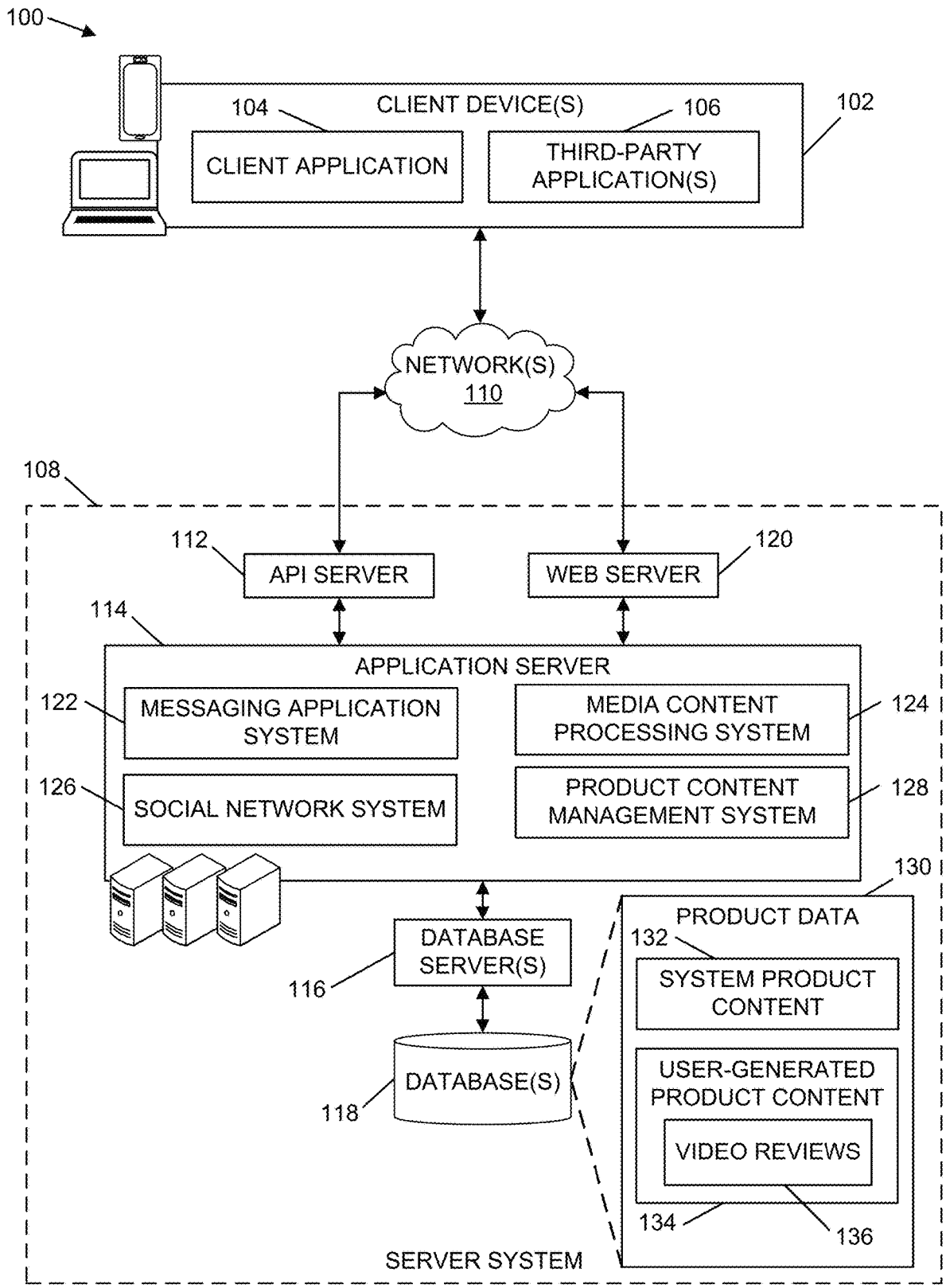
FIG. 1 is a diagrammatic representation of an architecture for exchanging data (e.g., messages and associated content) over a network, according to one or more example implementations.

Products may be purchased using online platforms. Typically, consumers may access a website or a mobile device application to obtain information about a product and purchase the product. Consumers may need to access multiple sources to obtain some information about a product that is not available via a website or a client application that may be used to purchase the product. For example, video content that is related to using a product or video reviews of a product are typically not accessible from a page of a website or a client application dedicated to the product. In contrast, consumers access video content that includes reviews or information about how a product may be used based on the source that creates the content, such as a social media account or website of the source that produces the video content. Consumers may then move to another website or client application to purchase the product.

In addition, individuals that create content for a product may need to use different websites, client applications, or other technology platforms to produce the content and to publish the content for access to additional individuals. To illustrate, an individual may capture video content related to a product using a first website, a first client application, or a first technology platform. The individual may then publish the video content using a second website, a second client application, or second technology platform. In one or more examples, individuals may post a link to content related to a product that is created using the first website, the first client application, or first technology platform within the second website, the second client application, or the second technology platform for users of the second website, the second client application, or the second technology platform to access the content related to the product. Thus, existing systems, techniques, and methods are inefficient in relation to the time and computing resources utilized to create, publish, and access information about a product, such as video content, and to purchase the product.

The systems, methods, techniques, instruction sequences, and computing machine program products described herein are directed to enabling users of a client application to produce video content related to a product and to making the video content accessible to other users of the client application via a page dedicated to providing information about the product. The process to initiate purchase of the product may also take place via the page that provides information about the product. Additionally, video content produced by users of the client application may be shared with other users of the client application via at least one of messaging functionality or social networking functionality of the client application. Further, content related to a product may be customized for users of the client application. To illustrate, content related to a product having a higher level of interest for a user of the client application may be more easily accessible to the user than content that has a lesser level of interest for the user.

In one or more implementations, users of a client application may capture video content related to a product using a client application and submit that video content to a server system. In one or more illustrative examples, the video content may include a review of the product. The server system may then store the video content in association with the product. As additional users of the client application request information about the product, the server system may cause the video content to be accessible to the users of the client application in relation to other information about the product.

Additionally, the server system may store the video content in association with information from a profile of the user. In this way, the video content may be stored in relation to characteristics of the user that created the video content. In various examples, the server system may also identify characteristics of users of the client application that view the video content, characteristics of users of the client application that purchase the product. or a combination thereof. In one or more implementations, the server system may perform an analysis of information about the video content and one or more users related to the video content to determine rankings for video content items related to a product with respect to one or more users of the client application. The rankings may indicate a predicted level of interest in video content items related to a product for respective users. The server system may use the rankings to determine an order in which to present the video content related to the product to users requesting information about the product.

Accordingly, the systems, methods, techniques, instruction sequences, and computing machine program products described herein provide various implementations to efficiently make video content related to a product accessible to consumers that may be interested in purchasing the product. For example, by providing a dedicated page by which video content and text content related to a product may be accessible and that includes user interface elements that are selectable to purchase the product, consumers may avoid accessing content from different sources, such as different websites or different mobile applications to obtain information about the product and purchase the product. Additionally, by providing a single platform to create and publish video content related to products, the implementations described herein may enable efficient production and access of video content of products in relation to existing systems that utilize multiple platforms, client applications, or websites to create and publish video content for products.

As referred to herein, the phrase "augmented reality experience," "augmented reality content item," "augmented reality content generator" includes or refers to various image processing operations corresponding to an image modification, filter, LENSES, media overlay, transformation, and the like, as described further herein.

FIG. 1 is a diagrammatic representation of an architecture 100 for exchanging data (e.g., messages and associated content) over a network. The architecture 100 may include multiple client devices 102. The client devices 102 may individually comprise, but are not limited to, a mobile phone, a desktop computer, a laptop computing device, a portable digital assistant (PDA), smart phone, tablet computing device, ultrabook, netbook, multi-processor system, microprocessor-based or programmable consumer electronic system, game console, set-top box, computer in a vehicle, a wearable device, one or more combinations thereof, or any other communication device that a user may utilize to access one or more components included in the architecture 100.

Each client device 102 may host a number of applications, including a client application 104 and one or more third-party applications 106. A user may use the client application 104 to create content, such as video, images (e.g., photographs), audio, and media overlays. In one or more illustrative examples, the client application 104 may include a social networking functionality that enables users to create and exchange content. In various examples, the client application 104 may include messaging functionality that may be used to send messages between instances of the client application 104 executed by various client devices 102. The messages created using the client application 104 may include video, one or more images, audio, media overlays, text, content produced using one or more creative tools, annotations, and the like. In one or more implementations, the client application 104 may be used to view and generate interactive messages, view locations of other users of the client application 104 on a map, chat with other users of the client application 104, and so forth.

One or more users may be a person, a machine, or other means of interacting with a client device, such as the client device 102. In example implementations, the user may not be part of the architecture 100 but may interact with one or more components of the architecture 100 via a client device 102 or other means. In various examples, users may provide input (e.g., touch screen input or alphanumeric input) to a client device 102 and the input may be communicated to other entities in the architecture 100. In this instance, the other entities in the architecture 100, responsive to the user input, may communicate information to a client device 102 to be presented to the users. In this way, users may interact with the various entities in the architecture 100 using the client device 102.

Each instance of the client application 104 is able to communicate and exchange data with at least one of another instance of the client application 104, one or more third-party applications 106, or a server system 108. The data exchanged between instances of the client applications 104, between the third-party applications 106, and between instances of the client application 104 and the server system 108 includes functions (e.g., commands to invoke functions) and payload data (e.g., text, audio, image, video, or other multimedia data). Data exchanged between instances of the client applications 104, between the third-party applications 106, and between at least one instance of the client application 104 and at least one third-party application 106 may be exchanged directly from an instance of an application executed by a client device 102 and an instance of an application executed by an additional client device 102. Further, data exchanged between the client applications 104, between the third-party applications 106, and between at least one client application 104 and at least one third-party application 106 may be communicated indirectly (e.g., via one or more intermediate servers) from an instance of an application executed by a client device 102 to another instance of an application executed by an additional client device 102. In one or more illustrative examples, the one or more intermediate servers used in indirect communications between applications may be included in the server system 108.

The third-party application(s) 106 may be separate and distinct from the client application 104. The third-party application(s) 106 may be downloaded and installed by the client device 102 separately from the client application 104. In various implementations, the third-party application(s) 106 may be downloaded and installed by the client device 102 before or after the client application 104 is downloaded and installed. The third-party application(s) 106 may be an application that is provided by an entity or organization that is different from the entity or organization that provides the client application 104. The third-party application(s) 106 may be accessed by the client device 102 using separate login credentials than the client application 104. Namely, the third-party application(s) 106 may maintain a first user account and the client application 104 may maintain a second user account. In one or more implementations, the third-party application(s) 106 may be accessed by the client device 102 to perform various activities and interactions, such as listening to music, videos, track exercises, view graphical elements (e.g., stickers), communicate with other users, and so forth. As an example, the third-party application(s) 106 may include a social networking application, a dating application, a ride or car sharing application, a shopping application, a trading application, a gaming application, an imaging application, a music application, a video browsing application, an exercise tracking application, a health monitoring application, a graphical element or sticker browsing application, or any other suitable application.

The server system 108 provides server-side functionality via one or more networks 110 to the client application 104. The server system 108 may be a cloud computing environment, according to some example implementations. For example, the server system 108, and one or more servers associated with the server system 108, may be associated with a cloud-based application, in one illustrative example. In one or more implementations, the client device 102 and the server system 108 may be coupled via the one or more networks 110.

The server system 108 supports various services and operations that are provided to the client application 104. Such operations include transmitting data to, receiving data from, and processing data generated by the client application 104. This data may include message content, media content, client device information, geolocation information, media annotation and overlays, message content persistence conditions, social network information, and live event information, as examples. Data exchanges within the architecture 100 are invoked and controlled through functions available via user interfaces (UIs) of the client application 104.

While certain functions of the architecture 100 are described herein as being performed by either a client application 104 or by the server system 108, the location of functionality either within the client application 104 or the server system 108 is a design choice. For example, it may be technically preferable to initially deploy certain technology and functionality within the server system 108, but to later migrate this technology and functionality to the client application 104 where a client device 102 has a sufficient processing capacity.

The server system 108 includes an Application Programming Interface (API) server 112 that is coupled to, and provides a programmatic interface to, an application server 114. The application server 114 is communicatively coupled to a database server 116 that facilitates access to one or more databases 118. The one or more databases 118 may store data associated with information processed by the application server 114. The one or more databases 118 may be storage devices that store information such as untreated media content, original media content from users (e.g., high-quality media content), processed media content (e.g., media content that is formatted for sharing with client devices 102 and viewing on client devices 102), context data related to a media content item, context data related to a user device (e.g., a computing or client device 102), media overlays, media overlay smart widgets or smart elements, user data, user device information, media content (e.g., video and images), media content data (e.g., data associated with video and images), computing device context data, serialized data, session data items, user device location data, mapping information, interactive message usage data, interactive message metrics data, and so forth. The one or more databases 118 may further store information related to third-party servers, client devices 102, client applications 104, users, third-party applications 106, and so forth.

The API server 112 receives and transmits data (e.g., commands and message payloads) between client devices 102 and the application server 114. Specifically, the Application Program Interface (API) server 112 provides a set of interfaces (e.g., routines and protocols) that can be called or queried by the client application 104 in order to invoke functionality of the application server 114. The Application Program Interface (API) server 112 exposes various functions supported by the application server 114, including account registration, login functionality, the sending of messages, via the application server 114, from one instance of the client application 104 to another instance of the client application 104, the sending of media files (e.g., images, audio, video) from a client application 104 to the application server 114, and for possible access by another client application 104, the setting of a collection of media content (e.g., a gallery, story, message collection, or media collection), the retrieval of a list of friends of a user of a client device 102, the retrieval of such collections, the retrieval of messages and content, the adding and deletion of friends to a social graph, the location of friends within a social graph, and opening an application event (e.g., relating to the client application 104).

The server system 108 may also include a web server 120. The web server 120 is coupled to the application servers 114, and provides web-based interfaces to the application servers 114. To this end, the web server 120 processes incoming network requests over the Hypertext Transfer Protocol (HTTP) and several other related protocols.

The application server 114 hosts a number of applications and subsystems, including a messaging application system 122, a media content processing system 124, a social network system 126, and a product content management system 128. The messaging application system 122 implements a number of message processing technologies and functions, particularly related to the aggregation and other processing of content (e.g., textual and multimedia content) included in messages received from multiple instances of the client application 104. For example, the messaging application system 122 may deliver messages using electronic mail (email), instant messaging (IM), Short Message Service (SMS), text, facsimile, or voice (e.g., Voice over IP (VoIP)) messages via wired networks (e.g., the Internet), plain old telephone service (POTS), or wireless networks (e.g., mobile, cellular, WIFI, Long Term Evolution (LTE), or Bluetooth). The messaging application system 122 may aggregate text and media content from multiple sources into collections of content. These collections are then made available, by the messaging application system 122, to the client application 104. Other processor- and memory-intensive processing of data may also be performed server-side by the messaging application system 122, in view of the hardware requirements for such processing.

The media content processing system 124 is dedicated to performing various media content processing operations, typically with respect to images, audio, or video received within the payload of a message or other content item at the messaging application system 122. The media content processing system 124 may access one or more data storages (e.g., the database(s) 118) to retrieve stored data to use in processing media content and to store results of processed media content.

The social network system 126 supports various social networking functions and services, and makes these functions and services available to the messaging application system 122. To this end, the social network system 126 maintains and accesses an entity graph within the database(s) 118. Examples of functions and services supported by the social network system 126 include the identification of other users of the client application 104 with which a particular user has relationships or is "following", and also the identification of other entities and interests of a particular user. The social network system 126 may access location information associated with each of the user's friends or other social network connections to determine where they live or are currently located geographically. In addition, the social network system 126 may maintain a location profile for each of the user's friends indicating the geographical location where the user's friends live.

The product content management system 128 may obtain content that is related to products offered for sale via the client application 104. The content may include text content, image content, video content, audio content, augmented content, or combinations thereof, that are produced using the client application 104. The product content management system 128 may store information obtained by the product content management system 128 in the database(s) 118 as product data 130. The product data 130 may include system product content 132 that is obtained by the product content management system 128 from one or more sources, such as manufacturers of products, retailers of product, or wholesalers of products. The product data 130 may also include user-generated product content 134 that is generated by individual users of the client application 104 in relation to one or more products offered for purchase via the client application 104.

The system product content 132 may include text content, audio content, image content, video content, or one or more combinations thereof. The system product content 132 may include pricing information for products offered for purchase via the client application 104. The system product content 132 may also include descriptions of products offered for purchase via the client application 104. In addition, the system product content 132 may include reviews of products offered for purchase via the client application 104. Further, the system product content 132 may include image content that includes pictures of one or more products offered for purchase via the client application 104. In various examples, the system product content 132 may include video content corresponding to products offered for purchase via the client application 104. In one or more implementations, at least one of the image content or the video content may include advertisements related to products offered for purchase using the client application 104. The system product content 132 may also include at least one of videos or images indicating the use of products offered for purchase via the client application 104.

The system product content 132 obtained by the product content management system 128 may be obtained by the product content management system 128 from one or more websites. In various examples, the product content management system 128 may implement one or more web crawlers to obtain information about products offered for sale via the client application 104 and store the information as system product content 132. In additional examples, at least one of manufacturers of products, retailers, or wholesalers of respective products offered for sale via the client application 104 may directly send information related to the respective products to the server system 108. The product content management system 128 may then store the information obtained directly by the server system 108 from the at least one of manufacturers, retailers, or wholesalers in the one or more databases 118.

The user-generated product content 134 may include text content, image content, video content, audio content, augmented content, media overlays, or one or more combinations thereof, that are generated using the client application 104. In various examples, the user-generated product content 134 may include images captured using the client application 104 that include products, such as products offered for purchase via the client application 104. Additionally, the user-generated product content 134 may comprise images captured by the client application that include products, where the images have one or more media overlays that are added to the images using tools of the client application 104. Further, the user-generated product content 134 may include videos captured using the client application 104, where the videos include products, such as products offered for purchase via the client application 104. In one or more illustrative examples, the user-generated product content 134 may include video reviews 136 of products that were captured using the client application 104 and that are directed to products offered for purchase via the client application 104.

The product content management system 128 may make information about products available to users of the client application 104. For example, users of the client application 104 may request information about products from the server system 108 and the product content management system 128 may provide the information to the client devices 102 of the users making the requests. In various examples, based on receiving a request for information about a product, the product content management system 128 may generate user interface data that includes information about the product associated with the request. The product content management system 128 may then send the user interface data to the client device 102 of the user making the request for information about the product and the client application 104 may display one or more pages that include the product information. In one or more illustrative examples, one or more pages that include information about the product may be dedicated to providing information about the product. In these situations, the one or more pages dedicated to providing information about the product may have minimal information about other products offered for purchase via the client application 104.

In addition to generating content using the client application 104 that may be stored as user-generated product content 134, users of the client application 104 may share the product related content using at least one of messaging functionality or social networking functionality of the client application 104. For example, a user of the client application 104 may capture a video review 136 related to a product and send the video review 136 to the server system 108. The product content management system 128 may store the video review 136 as user-generated product content 134. Additionally, the messaging application system 122 may produce one or more messages that include the video review 136 and send the one or more messages to one or more recipients of the one or more messages. Further, the social network system 126 may cause the video review 136 to be accessible to other users of the client application 104 in relation to a social network account of the user of the client application 104 that created the video review 136. To illustrate, contacts (e.g., friends, followers, social network connections, etc.) of the creator of the video review 136 may access the video review 136 via at least one social networking page of the creator of the video review 136.

In one or more implementations, at least one of the messaging application system 122, the social network system 126, or the product content management system 128 may be invoked based on input provided with respect to one or more user interface elements displayed by the client application 104 in relation to products available for purchase using the client application 104. For example, with respect to a product offered for purchase via the client application 104, the client application 104 may display a user interface that includes information about the product, such as a name of the product, a description of the product, a rating of the product, a price of the product, or one or more combinations thereof. The user interface may also include a first user interface element that is selectable to submit video content related to the product. Selection of the first user interface element may enable a user of the client application 104 to capture video content, such as a video review 136, related to the product. Based on selection of the first user interface element and subsequent capture of the video content, an identifier of the product may be associated with the video content. An additional identifier may also be associated with the video content indicating that the video content may be accessible via one or more pages displayed by the client application 104 that are dedicated to providing information about the product.

In various examples, after capturing the video content using the client application 104, a number of user interface elements may be displayed in relation to the video content. At least a portion of the user interface elements may be selectable to invoke one or more tools of the client application 104. The one or more tools may be implemented by a user of the client application 104 to modify the video content. For example, the one or more tools may be used to add augmented content, such as one or more overlays, to the video content. In additional examples, the one or more tools may be used to modify characteristics of the video content, such as a rate of playback of the video content or audio features of the video content.

The number of user interface elements displayed in relation to the video content after the capture of the video content may also include a first additional user interface element and a second additional user interface element. The first additional user interface element may be selectable to invoke messaging functionality of the client application 104 to generate a message that includes the video content and indicates one or more recipients of the message. Message data that includes the video content may be sent to the server system 108 and the messaging application system 122 may send respective messages to each of the one or more recipients indicated in the message data. Additionally, selection of the second additional user interface element may invoke social networking functionality of the client application 104 that causes the client application 104 to send the video content to the server system 108. The social network system 126 may then notify one or more social network connections of the creator of the video content that the video content is available for viewing using the social networking functionality of the client application 104.

In various examples, a user interface displayed by the client application 104 that includes information about the product may also include one or more user interface elements that are selectable to share information about the product by sending messages to one or more recipients indicating one or more user additional user interface elements that are selectable to access one or more pages that include the information about the product. Further, the user interface displayed by the client application 104 that includes information about the product may include one or more user interface elements that are selectable to make information about the product accessible to one or more contacts of a user of the client application 104.

The product content management system 128 may also determine an order in which to present video content related to a product to individual users of the client application 104. In one or more implementations, the server system 108 may receive a request from an instance of the client application 104 executed by a client device 102 to obtain information about a product. Responsive to the request, the product content management system 128 may retrieve a portion of the system product content 132 that corresponds to the product and a portion of the user-generated product content 134 that corresponds to the product. The product content management system 128 may determine a level of interest in content items included in the user-generated product content 134 with respect to the user of the client application 104 that submitted the request. In various examples, the product content management system 128 may analyze characteristics of the user of the client application 104 submitting the request in relation to characteristics of additional users of the client application 104 that created at least a portion of the content items included in the user-generated product content 134 to determine a level of interest of the user with respect to the respective content items associated with the product. Additionally, the product content management system 128 may analyze characteristics of the user of the client application 104 submitting the request in relation to characteristics of additional users of the client application 104 that consumed (e.g., viewed, listened to) respective content items associated with the product to determine a level of interest of the user in relation to the various content items. Based on the level of interest of the user of the client application 104 requesting information about the product in relation to the content items associated with the product, the product content management system 128 may rank individual content items with respect to the user. Content items, such as video reviews 136, having relatively higher rankings may be presented to the user before content items having relatively lower rankings. In various examples, content items having relatively higher rankings may be presented closer to a top of a user interface page that includes information about a product than content items having a relatively lower ranking that may be presented in lower positions of the page.

Figure 2:
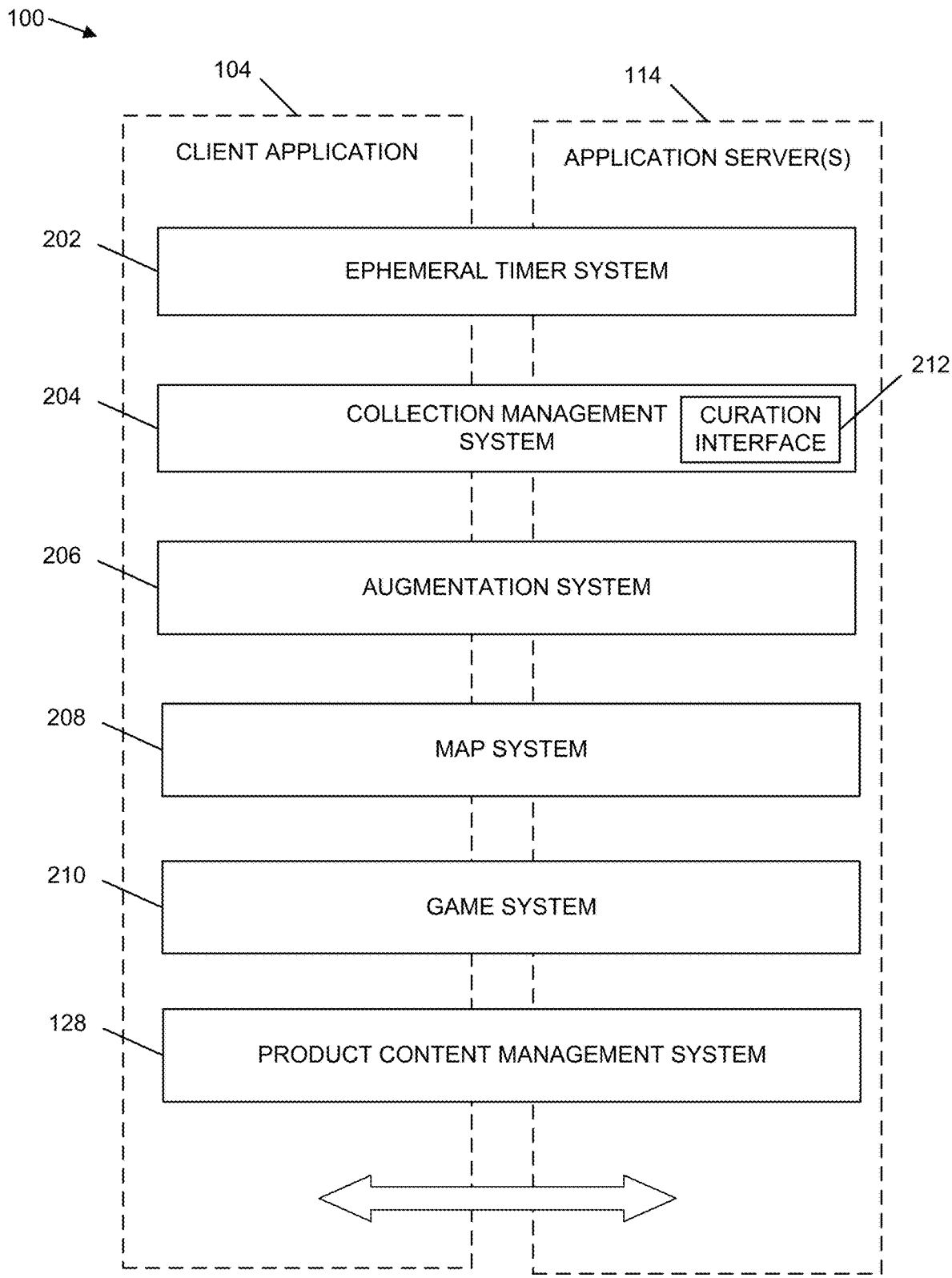
FIG. 2 is a diagrammatic representation of a system, in accordance with some examples, that may have both client-side and server-side functionality.

FIG. 2 is a block diagram illustrating further details regarding the server system 108, according to some examples. Specifically, the server system 108 is shown to comprise the client application 104 and the application servers 114. The server system 108 embodies a number of subsystems, which are supported on the client-side by the client application 104 and on the sever-side by the application servers 114. These subsystems include, for example, an ephemeral timer system 202, a collection management system 204, an augmentation system 206, a map system 208, a game system 210, and the product content management system 128.

The ephemeral timer system 202 is responsible for enforcing the temporary or time-limited access to content by the client application 104 and the messaging application system 122. The ephemeral timer system 202 incorporates a number of timers that, based on duration and display parameters associated with a message, or collection of messages (e.g., a story), selectively enable access (e.g., for presentation and display) to messages and associated content via the client application 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the client application 104.

The collection management system 204 furthermore includes a curation interface 212 that allows a collection manager to manage and curate a particular collection of content. For example, the curation interface 212 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with content produced via the client application 104, such as a message. For example, the augmentation system 206 provides functions related to the generation and publishing of media overlays for content processed by the server system 108. The augmentation system 206 operatively supplies a media overlay or augmentation (e.g., an image filter) to the client application 104 based on a geolocation of the client device 102. In another example, the augmentation system 206 operatively supplies a media overlay to the client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 206 uses the geolocation of the client device 102 to identify a media overlay that includes the name of a merchant at the geolocation of the client device 102. The media overlay may include other indicia associated with the merchant. The media overlays may be stored in the database(s) 118 and accessed through the database server(s) 116.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 208 provides various geographic location functions, and supports the presentation of map-based media content and messages by the client application 104. For example, the map system 208 enables the display of user icons or avatars (e.g., stored in profile data 308 of FIG. 3) on a map to indicate a current or past location of "friends" of a user, as well as media content (e.g., collections of messages including photographs and videos) generated by such friends, within the context of a map. For example, a message posted by a user to the server system 108 from a specific geographic location may be displayed within the context of a map at that particular location to "friends" of a specific user on a map interface of the client application 104. A user can furthermore share his or her location and status information (e.g., using an appropriate status avatar) with other users of the server system 108 via the client application 104, with this location and status information being similarly displayed within the context of a map interface of the client application 104 to selected users.

The game system 210 provides various gaming functions within the context of the client application 104. The client application 104 provides a game interface providing a list of available games that can be launched by a user within the context of the client application 104, and played with other users of the server system 108. The server system 108 further enables a particular user to invite other users to participate in the play of a specific game, by issuing invitations to such other users from the client application 104. The client application 104 also supports both the voice and text messaging (e.g., chats) within the context of gameplay, provides a leaderboard for the games, and also supports the provision of in-game rewards (e.g., coins and items).

The product content management system 128 may obtain, store, and manage content generated using the client application 104 that is related to products available for purchase via the client application 104. The product-related content may be included in a collection of content managed by the collection management system 204 in relation to one or more users of the client application 104. In addition, the product-related content may include one or more augmentations produced in conjunction with the augmentation system 206.

Figure 3:
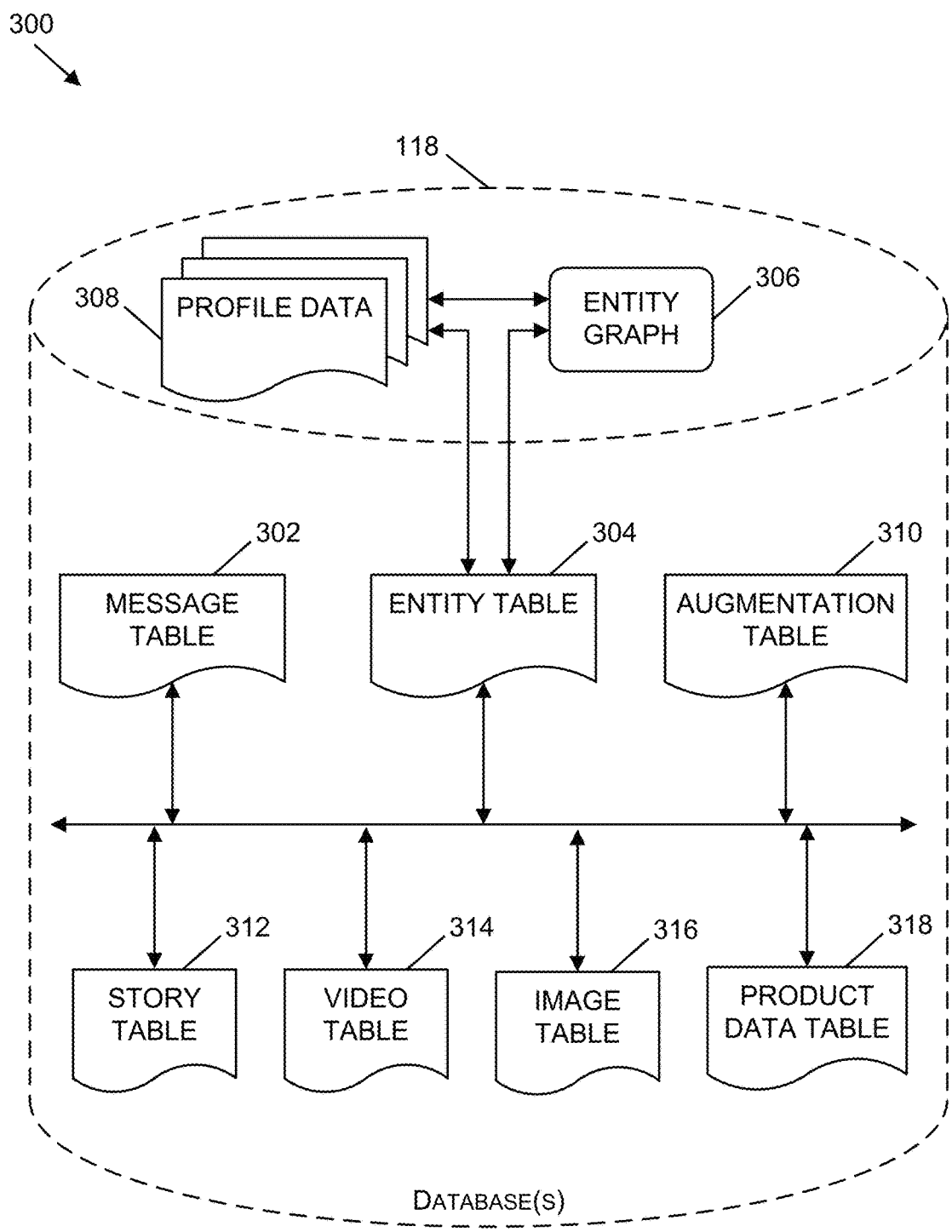
FIG. 3 is a schematic diagram illustrating data that may be stored in a database of a server system, according to one or more example implementations.

FIG. 3 is a schematic diagram illustrating data structures 300 which may be stored in the database(s) 118 of the server system 108, according to one or more example implementations. While the content of the database(s) 118 is shown to comprise a number of tables, it will be appreciated that the data could be stored in other types of data structures (e.g., as an object-oriented database).

The database 118 includes message data stored within a message table 302. This message data includes, for any particular one message, at least message sender data, message recipient (or receiver) data, and a payload.

An entity table 304 stores entity data, and is linked (e.g., referentially) to an entity graph 306 and profile data 308. Entities for which records are maintained within the entity table 304 may include individuals, corporate entities, organizations, objects, places, events, and so forth. Regardless of entity type, any entity regarding which the server system 108 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization) interested-based or activity-based, merely for example.

The profile data 308 stores multiple types of profile data about a particular entity. The profile data 308 may be selectively used and presented to other users of the architecture 100, based on privacy settings specified by a particular entity. Where the entity is an individual, the profile data 308 includes, for example, a username, telephone number, address, settings (e.g., notification and privacy settings), as well as a user-selected avatar representation (or collection of such avatar representations). A particular user may then selectively include one or more of these avatar representations within the content of messages or other data communicated via the architecture 100, and on map interfaces displayed by client application 104 to other users. The collection of avatar representations may include "status avatars," which present a graphical representation of a status or activity that the user may select to communicate at a particular time.

Where the entity is a group, the profile data 308 for the group may similarly include one or more avatar representations associated with the group, in addition to the group name, members, and various settings (e.g., notifications) for the relevant group.

The database 118 also stores augmentation data, such as overlays or filters, in an augmentation table 310. The augmentation data is associated with and applied to videos (for which data is stored in a video table 314) and images (for which data is stored in an image table 316).

Filters, in one example, are overlays that are displayed as overlaid on an image or video during presentation to a recipient user. Filters may be of various types, including user-selected filters from a set of filters presented to a sending user by the client application 104 when the sending user is composing a message. Other types of filters include geolocation filters (also known as geo-filters), which may be presented to a sending user based on geographic location. For example, geolocation filters specific to a neighborhood or special location may be presented within a user interface by the client application 104, based on geolocation information determined by a Global Positioning System (GPS) unit of the client device 102.

Another type of filter is a data filter, which may be selectively presented to a sending user by the client application 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 316 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various implementations, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various implementations, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some implementations, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In various examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In one or more systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

A computer animation model to transform image data can be used by a system where a user may capture an image or video stream of the user (e.g., a selfie) using a client device 102 having a neural network operating as part of a client application 104 operating on the client device 102. The transformation system operating within the client application 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various implementations, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some implementations, individual faces, among a group of multiple faces, may be individually modified, or such modifications may be individually toggled by tapping or selecting the individual face or a series of individual faces displayed within the graphical user interface.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 304). A user may create a "personal story" in the form of a collection of content that has been created and sent/broadcast by that user. To this end, the user interface of the client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the client application 104, to contribute content to a particular live story. The live story may be identified to the user by the client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 314 stores video data that, in one example, is associated with messages for which records are maintained within the message table 302. Similarly, the image table 316 stores image data associated with messages for which message data is stored in the entity table 304. The entity table 304 may associate various augmentations from the augmentation table 310 with various images and videos stored in the image table 316 and the video table 314.

The database(s) 118 may also store a product data table 318. The product data table 318 may include the product data 130 described with respect to FIG. 1. In one or more implementations, the product data table 318 may include one or more columns that include one or more identifiers for an individual product. The one or more identifiers may include an alphanumeric identifier, a barcode, a quick response (QR) code, or one or more combinations thereof, related to the product. In various examples, the one or more identifiers associated with an individual product may be provided by at least one of a manufacturer of the product, a retailer of the product, or a wholesaler of the product. In one or more additional implementations, the product data table 318 may include one or more columns that include respective identifiers of users of the client application 104 that created content associated with a product offered for purchase via the client application 104. In this way, characteristics of users that created content related to the product may be accessible and used to determine a level of interest of an additional user that is requesting information about the product.

Figure 4:
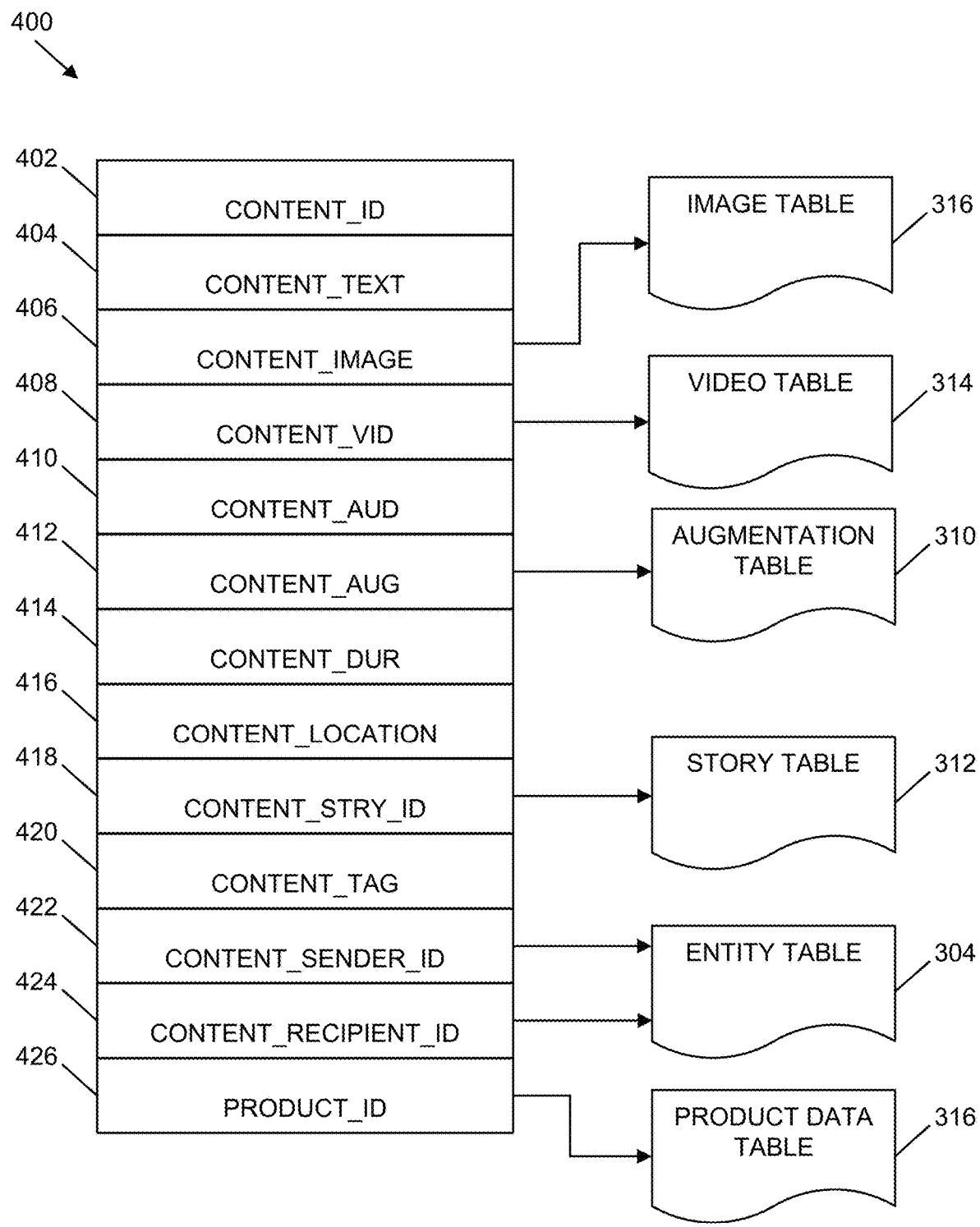
FIG. 4 is a schematic diagram illustrating an example framework for content that may be generated by a client application, in accordance with one or more example implementations.

FIG. 4 is a schematic diagram illustrating an example framework for content 400, according to some implementations. The content 400 may be generated by the client application 104. In various examples, the content 400 may be generated by a first instance of the client application 104 and communicated to at least one of a second instance of the client application 104 or the server system 108. In situations where the content 400 includes a message, the content 400 may be used to populate the message table 302 stored within the database(s) 118 and accessible by the application server 114. In one or more implementations, the content 400 may be stored in memory as "in-transit" or "in-flight" data of at least one of client devices 102 or the application server 114. The content 400 is shown to include at least a portion of the following components:

content identifier 402: a unique identifier that identifies the content 400.

content text payload 404: text, to be generated by a user via a user interface of the client device 102, and that is included in the content 400.

content image payload 406: image data, captured by a camera component of a client device 102 or retrieved from a memory component of a client device 102, and that is included in the content 400. Image data for a sent or received content 400 may be stored in the image table 316.

content video payload 408: video data, captured by a camera component or retrieved from a memory component of the client device 102, and that is included in the content 400. Video data for a sent or received content 400 may be stored in the video table 314.

content audio payload 410: audio data, captured by a microphone or retrieved from a memory component of the client device 102, and that is included in the content 400.

content augmentation data 412: augmentation data (e.g., filters, stickers, or other annotations or enhancements) that represents augmentations to be applied to content image payload 406, content video payload 408, or content audio payload 410 of the content 400. Augmentation data for a sent or received content 400 may be stored in the augmentation table 310.

content duration parameter 414: parameter value indicating, in seconds, the amount of time for which one or more portions of the content 400 (e.g., the content image payload 406, content video payload 408, content audio payload 410) are to be presented or made accessible to a user via the client application 104.

content geolocation parameter 416: geolocation data (e.g., latitudinal and longitudinal coordinates) associated with the content payload of the message. Multiple content geolocation parameter 416 values may be included in the payload, each of these parameter values being associated with respect to content items included in the content (e.g., a specific image into within the content image payload 406, or a specific video in the content video payload 408).

content story identifier 418: identifier values identifying one or more content collections (e.g., "stories" identified in the story table 312) with which a particular item in the content image payload 406 of the content 400 is associated. For example, multiple images within the content image payload 406 may each be associated with multiple content collections using identifier values.

content tag 420: each content 400 may be tagged with multiple tags, each of which is indicative of the subject matter of content included in the content payload. For example, where a particular image included in the content image payload 406 depicts an animal (e.g., a lion), a tag value may be included within the content tag 420 that is indicative of the relevant animal. Tag values may be generated manually, based on user input, or may be automatically generated using, for example, image recognition.

content sender identifier 422: an identifier (e.g., a messaging system identifier, email address, or device identifier) indicative of a user of the client device 102 on which the content 400 was generated and from which the content 400 was sent.

content receiver identifier 424: an identifier (e.g., a messaging system identifier, email address, or device identifier) indicative of a user of the client device 102 to which the content 400 is addressed.

A product identifier 426: an identifier of a product that is associated with the content 400 and may be purchased via the client application 104. In one or more illustrative examples, the product identifier 426 may correspond to one or more alphanumeric characters or symbols. In various examples, the product identifier 426 may be used to track the product within a system of service provider that maintains and operates the server system 108. The product identifier 426 may be assigned to the product by the service provider. In additional examples, the product identifier 426 may be provided by at least one of a manufacturer of the product, a retailer of the product, or a wholesaler of the product.

The data (e.g., values) of the various components of content 400 may correspond to pointers to locations in tables within which the data is stored. For example, an image value in the content image payload 406 may be a pointer to (or address of) a location within an image table 316. Similarly, values within the content video payload 408 may point to data stored within a video table 314, values stored within the content augmentations 412 may point to data stored in an augmentation table 310, values stored within the content story identifier 418 may point to data stored in a story table 312, and values stored within the content sender identifier 422 and the content recipient identifier 424 may point to user records stored within an entity table 304. Further, values of the product identifier 426 may point to data stored within a data structure that includes the product data table 318.

Figure 5:
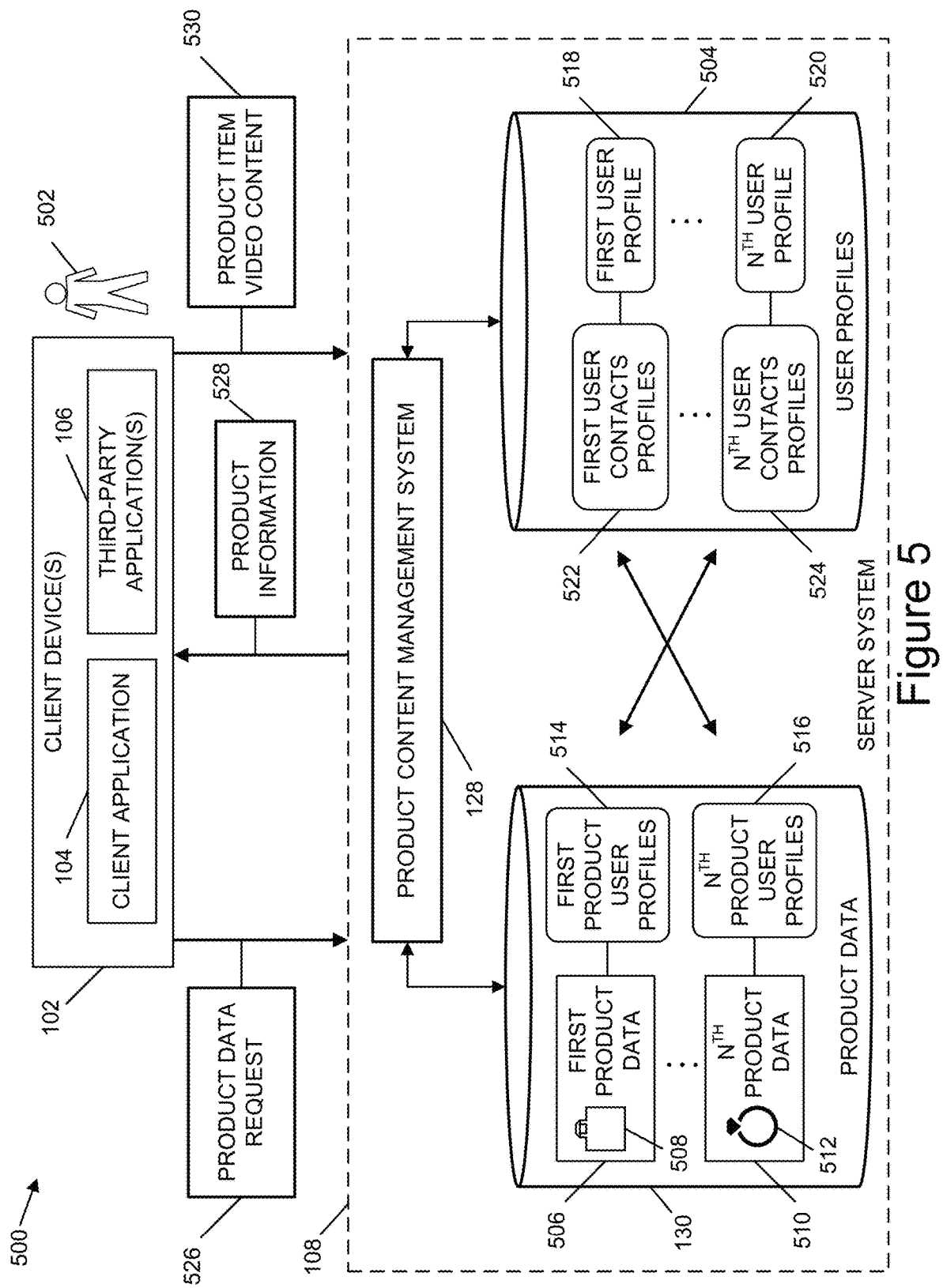
FIG. 5 is a diagrammatic representation illustrating an architecture that may obtain content related to products and provide the content related to the products to users of a client application, in accordance with one or more example implementations.

FIG. 5 is a diagrammatic representation illustrating an architecture 500 that may obtain content related to products and provide the content related to the product to users of a client application, in accordance with one or more example implementations. The architecture 500 may include a client device 102 that is operated by a user 502. The architecture 500 may also include the server system 108 and the product content management system 128. Additionally, the server system 108 may store the product data 130. For example, the server system 108 may store the product data 130 in the database(s) 118. Further, the server system 108 may store user profiles 504. In various examples, the server system 108 may store the user profiles 504 in the database(s) 118. The user profiles 504 may include information about users of the client application 104.

The product data 130 may include data about a number of products offered for purchase using the client application 104. To illustrate, the product data 130 may include the first product data 506 that is associated with a first product 508 up to Nth product data 510 that is associated with an Nth product 512. The first product data 506 may indicate pricing information for the first product 508, one or more descriptions of the first product 508, one or more identifiers of the first product 508, one or more ratings of the first product 508, one or more reviews of the first product 508, a manufacturer of the first product 508, a seller of the first product 508, image content related to the first product 508, video content related to the first product 508, one or more reviews of the first product 508, one or more combinations thereof, and the like. Additionally, the Nth product data 510 may indicate pricing information for the Nth product 512, one or more descriptions of the Nth product 512, one or more identifiers of the Nth product 512, one or more ratings of the Nth product 512, one or more reviews of the Nth product 512, a manufacturer of the Nth product 512, a seller of the Nth product 512, image content related to the Nth product 512, video content related to the Nth product 512, one or more reviews of the Nth product 512, one or more combinations thereof, and the like.

The product data 130 may also include first product user profiles 514 that correspond to the first product 508 up to Nth product user profiles 516 that correspond to the Nth product 512. The first product user profiles 514 may include information corresponding to user profiles of at least one of users of the client application 104 that purchased the first product 508 or users of the client application 104 that provided content related to the first product 508. Additionally, the Nth product user profiles 516 may include information corresponding to user profiles of at least one of users of the client application 104 that purchased the Nth product 512 or users of the client application 104 that provided content related to the Nth product 512. The first product user profiles 514 may be stored in association with the first product data 506 and the Nth product user profiles 516 may be stored in association with the Nth product data 510. For example, the first product user profiles 514 may be stored such that information included in the first product user profiles 514 may be accessed in relation to information about the first product 508. To illustrate, in situations that the product content management system 128 determines a level of interest for a user of the client application 104 with respect to content, such as video content, related to a product, information included in the user profiles corresponding to the product may be analyzed by the product content management system 128.

In one or more implementations, individual user profiles included in the first product user profiles 514 may be connected to the first product data 506 and individual user profiles included in the second product user profiles may be connected to the Nth product data 510. Relationships between individual user profiles and product data may be implemented using database links. Additionally, relationships between individual user profiles and product data may be implemented by storing identifiers of one or more products in one or more columns of database tables that store information about users of the client application 104. Connections between individual user profiles and product data may also be implemented by storing identifiers of users of the client application in one or more columns of database tables that store information about products offered for purchase via the client application 104.

The user profiles 504 may include profile information of individual users of the client application 104. For example, the user profiles 504 may include a first user profile 518 up to an Nth user profile 520. Each of the user profiles 504 may include information related to one or more identifiers of a user of the client application 104 (e.g., name, account identifier, login), demographic information of a user of the client application 104 (e.g., age, gender, occupation), location information of a user of the client application 104 (e.g., geographic positioning system (GPS) data, city of residence, state of residence, country of residence), contacts of a user of the client application 104 (e.g., friends, followers, users being followed), viewing history indicating content viewed by a user using the client application 104, sharing history indicating content shared by a user using the client application 104, purchase history indicating products purchased by a user using the client application 104, one or more combinations thereof, and the like.

Individual user profiles 504 may be associated with profiles of contacts of the individual users. To illustrate, the first user profile 518 may be associated with first user contacts profiles and the Nth user profile 520 may be associated with Nth user contacts profiles 524. Relationships between respective user profiles 504 may be indicated by entity graphs 306 related to individual users of the client application 104. In one or more examples, connections between individual user profiles and user profiles of contacts of the individual may be implemented by storing identifiers of contacts of users in one or more columns of database tables that store information about individual users of the client application 104. In various examples, the individual user profiles 504 may be connected with user profiles of contacts of the individual users to provide additional data for the product content management system 128 to use in determining levels of interest of users of the client application 104 in viewing content related to a product.

In one or more illustrative examples, the user 502 may use the client application 104 to submit a product data request 526 to the server system 108. The product data request 526 may indicate a request to obtain information about a product offered for purchase using the client application 104, such as the first product 508. In one or more examples, the product data request 526 may be submitted to the server system 108 in response to selection of one or more user interface elements included in at least one user interface displayed by the client application 104. In various examples, the user 502 may select a user interface element that indicates an identifier of the first product 508, such as a name of the first product, that is included in a user interface displayed by the client application 104. The user interface element indicating the identifier of the first product 508 may be displayed in relation to an advertisement associated with the first product 508. In additional examples, the user interface element indicating the identifier of the first product 508 may be displayed with respect to an account of another user of the client application 104. For example, an additional user of the client application 104 may send a message to one or more recipients that include the first user 502, where the message includes a user interface element indicating the identifier of the first product 508. Further, an additional user of the client application 104 may create social networking content, such as at least one of text content, image content, or video content, that includes a user interface element indicating the identifier of the first product 508 that is accessible to the first user 502 based on the first user 502 having a social networking connection with the additional user. In still additional examples, the user interface element indicating the identifier of the first product 508 may be included in a list of results that are responsive to a search by the user 502 for products related to one or more search criteria, such as one or more keywords provided by the user 502 via the client application 104. In one or more implementations, the product data request 526 may include an identifier of the product for which the user 502 is requesting information.

After receiving the product data request 526, the server system 108 may send product information 528 to the client device 102. In response to the product data request 526, the product content management system 128 may determine at least one product that corresponds to the product data request 526. The product content management system 128 may then obtain information from the product data 130 corresponding to the at least one product. As a result, the product content management system 128 may send the product information 528 to the client device 102 that includes at least a portion of the product data 130 corresponding to the at least one product. In one or more illustrative examples, the product data request 526 may request information about the first product 508. The product content management system 128 may then obtain at least a portion of the first product data 506 and send at least a portion of the first product data 506 to the client device 102 as the product information 528. The client application 104 may display the product information 528 in one or more user interfaces.

In one or more implementations, the product content management system 128 may determine video content to provide to client devices 102 in response to requests for information about products offered for purchase via the client application 104. In various examples, the product content management system 128 may perform an analysis of information related to users of the client application 104 requesting information about products and information related to the products to determine a level of interest in video content items related to products for which users of the client application 104 are requesting information. The level of interest of a user of the client application 104 in relation to respective video content items may be based on a measure of similarity between the user of the client application 104 requesting information about the product and the respective users of the client application 104 that generate the video content items. A measure of similarity between a user of the client application 104 requesting information about a product and an additional user of the client application 104 that generated video content related to the product may be determined by analyzing a profile of the user of the client application 104 that requested the information about the product with respect to a profile of the additional user of the client application 104 that produced the video content.

In various examples, a level of interest of a user of the client application 104 in viewing video content related to a product offered for purchase via the client application 104 may be based on a measure of similarity between a user of the client application 104 that is requesting information about the product and users of the client application 104 that have previously viewed the video content. In one or more illustrative examples, the product content management system 128 may determine a measure of similarity between a user of the client application 104 that is requesting information about a product and an additional user of the client application 104 that generated video content related to the product by analyzing a profile of the user of the client application 104 that is requesting information about the product in relation to a profile of the additional user of the client application 104 that generated the video content related to the product. In one or more examples, the product content management system 128 may determine users of the client application 104 that satisfy at least a threshold level of interest in a product and analyze profiles of the users satisfying at least the threshold level of interest in a product in relation to a profile of a user of the client application 104 that is requesting information about the product. The product content management system 128 may determine a level of interest of a respective user of the client application 104 in at least one of the product or viewing video content related to the product based on at least one of a purchase of the product by the user, purchases of the product by contacts of the user, an amount of time video content related to the product has been viewed by the user, an amount of time video content related to additional products that are characterized in a same category or a similar category of the product has been viewed by the user, or an amount of time video content related to additional products that are characterized in a same category or a similar category of the product has been viewed by contacts of the user, messaging content of the user that is related to the product, or social networking content of the user that is related to the product.

In one or more illustrative examples, the product content management system 128 may determine video content related to the first product 508 to include in the product information 528 by analyzing a profile of the user 502 with respect to profiles of at least one of other users of the client application 104 that created video content related to the first product 508 or additional users of the client application 104 that viewed video content related to the first product 508. To illustrate, the first user profile 518 may correspond to a user profile of the user 502 and Nth user profile 520 may correspond to an additional user of the client application 104 that at least one of generated video content related to the first product 508 or viewed video content related to the first product 508. In these scenarios, the product content management system 128 may perform an analysis of the first user profile 518 with respect to the Nth user profile 520 to determine a level of interest of the user 502 in video content related to the additional user of the client application 104.

In various examples, the product content management system 128 may determine a level of similarity between characteristics of the user 502 included in the first user profile 518 in relation to characteristics of the additional user included in the Nth user profile 520. For example, the product content management system 128 may determine first values for characteristics of the user 502 in the first user profile 518 and analyze the first values with respect to second values of characteristics of the additional user of the client application 104 that are included in the Nth user profile. In one or more implementations, the product content management system 128 may determine a location of the user 502 based on information included in the first user profile 518 and analyze the location of the user 502 in relation to a location of the additional user of the client application 104 indicated by the Nth user profile 520. The product content management system 128 may determine a relatively higher measure of similarity with respect to the user 502 and the additional user based on a proximity of the location of the user 502 with respect to the location of the additional user. To illustrate, the product content management system 128 may determine a level of similarity between the user 502 and the additional user that is higher in situations where the user 502 and the additional user are located within a first threshold number of miles (e.g., 10 kilometers) and a relatively lower measure of similarity in situations where the user 502 and the additional user are located within a second threshold number of miles that is greater than the first threshold number of miles (e.g. 100 km).

In additional examples, the product content management system 128 may analyze a first amount of time that the first user 502 viewed video content related to products included in a same category or a similar category as the first product 508 in relation to a second amount of time that the additional user viewed video content related to products included in the same category or the similar category as the first product 508. In these scenarios, the product content management system 128 may determine a relatively higher measure of similarity between the user 502 and the additional user in situations where the first amount of time is within a first threshold time amount (e.g., 30 minutes) of the second amount of time and a relatively lower amount of time in situations where the first amount of time is within a second threshold time amount (e.g., 3 hours) of the second amount of time, where the second threshold time amount is greater than the first threshold time amount. Additional characteristics that the product content management system 128 may analyze to determine a measure of similarity between the user 502 and the additional user may include at least one of age, gender, occupation, or product purchase history.

To determine a level of interest of the user 502 in video content related to the first product 508, the product content management system 128 may also analyze the first user profile 518 with respect to one or more of the first product user profiles 514 that correspond to additional users of the client application 104 that have viewed video content related to the first product 508. In one or more examples, the product content management system 128 may determine a portion of the first product user profiles 514 that correspond to users of the client application 104 that have viewed video content items that are related to the first product 508. The product content management system 128 may identify additional users of the client application 104 that have profiles that have at least a threshold amount of similarity with the first user profile 518. The product content management system 128 may also determine video content items that have been viewed by the additional users having profiles with the threshold amount of similarity with the first user profile 518. The product content management system 128 may then determine that the user 502 has at least a threshold level of interest in at least a portion of the video content items.

In one or more implementations, at least a portion of the first product user profiles 514 that have viewed video content related to the first product 508 may also be included in the first user contact profiles 522. Thus, there may be overlap in the additional users of the client application 104 that are contacts of the first user 502 and users of the client application 104 that have viewed video content related to the first product 508. In these situations, the product content management system 128 may determine that a level of interest in video content related to the first product 508 that is viewed by a contact of the user 502 is higher than a level of interest in video content that is viewed by users of the client application 104 that are not included in the contacts of the user 502. In this way, the product content management system 128 may prioritize video content viewed by users of the client application 104 that have a connection with the user 502 in the presentation of video content related to the first product 508 to the user 502 via the client application 104. The product content management system 128 may also prioritize video content that is created by contacts of the user 502, such as friends of the user 502, in the presentation of video content related to the first product 508 to the user 502. In various example, when determining video content related to the first product 508 to surface to the user 502 via the client application 104, the product content management system 128 may increase the weighting of video content related to the first product 508 that is at least one of viewed by contacts of the user 502 or created by contacts of the user 502 in relation to the weighting of video content viewed by or created by other users of the client application 104 that are not connected to the user 502. In one or more examples, the amount of increase of the weighting of video content related to the first product 508 may be based on a number of degrees of separation between the user 502 and an additional user of the client application 104 that at least one of viewed or created the video content related to the first product 508. To illustrate, video content related to the first product 508 that is viewed by or created by direct friends of the user 502 may be weighted more highly and be more likely to be presented to the user 502 than video content related to the first product 508 that is viewed by or created by a friend of a friend of the user 502.

The product content management system 128 may also determine a level of interest for the user 502 with respect to video content related to the first product 508 based on characteristics of the video content in relation to characteristics of video content previously viewed by the user 502. Examples of characteristics of video content that may be analyzed by the product content management system 128 may include creator of video content, individuals included in the video content, category of the video content, a date that the video content was published, one or more additional products included in the video content, location associated with the video content, one or more combinations thereof, and the like. For example, the product content management system 128 may determine that a level of interest of the user 502 in a video content item related to the first product 508 may be relatively higher in situations where the user 502 has viewed additional video content items generated by the creator in relation to video content items generated by creators for which the user 502 has not viewed video content. In additional examples, the product content management system 128 may determine that a level of interest of the user 502 in a video content item related to the first product 508 is relatively higher in situations where a contact of the user 502 has viewed additional video content items generated by the creator of the video content item in relation to video content items generated by creators for which contacts of the user 502 have not viewed additional video content items.

Based on the respective levels of interest of the user 502 in a number of content items related to the first product 508, the product content management system 128 may determine rankings of video content items in relation to the user 502. In one or more examples, product content management system 128 may determine that the video content items related to the first product 508 having a relatively higher level of interest with respect to the user 502 may have higher rankings than video content items related to the first product 508 having relatively lower levels of interest with respect to the user 502. In one or more implementations, the product content management system 128 may determine video content to include in the product information 528 based on the rankings of the video content items related to the first product 508 with respect to the user 502. In various examples, the product content management system 128 may determine a threshold ranking (e.g., top 3, 5, top 10, top 50, top 100) to identify the video content items related to the first product 508 to include in the first product data 506. The product content management system 128 may also determine an order in which to present video content to the user 502 via one or more user interfaces of the client application 104 based on the rankings of the respective video content items. In one or more implementations, the order in which to present video content to the user 502 may be based at least partly on whether or not video content is at least one of created by or viewed by an additional user of the client application 104 that is connected to the user 502, such as a friend of the user 502 or an additional user of the client application 104 that the user 502 is following.

In various implementations, users of the client application 104 may generate video content related to products offered for purchase via the client application 104. In one or more illustrative examples, the user 502 may generate video content related to a product offered for purchase via the client application 104, such as video content related to the first product 508. In one or more examples, a user interface generated by the client application 104 may include information about a product offered for purchase via the client application 104. The user interface may also include a user interface element that is selectable to capture video content related to the product. To illustrate, selection of the user interface element may cause one or more cameras of the client device 102 to activate and enable capture of video using the one or more cameras. In one or more illustrative examples, the user 502 may create a video review of the first product 508 using the client application 104.

The video content created by the user 502 with respect to the first product 508 may be sent to the server system 108 as product item video content 530. The product item video content 530 may include video captured by one or more input devices of the client device 102. The product item video content 530 may also include content produced using one or more tools of the client application 104. For example, the product item video content 530 may include at least one of one or more text overlays, one or more image overlays, one or more user-generated overlays, one or more video overlays for the video captured by the client device 102, or one or more other augmented reality content items. The product item video content 530 may also include at least one of an identifier of the first product 508 or an identifier of the user 502. Further, the product item video content 530 may include additional information corresponding to the video content captured by the user 502 using the client application 104, such as at least one of a duration of the video content, a timestamp indicating when the video content was captured, or a location related to the video content. In one or more examples, the product item video content 530 may also indicate a privacy setting. The privacy setting may indicate an audience for one or more video content items created by the user 502. To illustrate, the product item video content 530 may indicate that one or more video content items created by the user 502 are to be accessible to contacts of the user 502 in relation to the client application 104, such as friends of the user 502, but are not accessible to additional users of the client application 104 that are not contacts of the user 502. Additionally, the product item video content 530 may indicate that one or more video content items created by the user 502 may be accessible to users of the client application 104 that are outside of contacts of the user 502. In this way, the user 502 may specify a relatively narrow audience for one or more video content items created by the user 502, such as direct friends of the user 502 with respect to the client application 104, or a broader audience that includes more users of the client application 104 than contacts of the user 502.

In response to the server system 108 receiving the product item video content 530, the product content management system 128 may determine an identifier of the product associated with the video content included in the product item video content 530. The product content management system 128 may store the video content in the product data 130 in relation to the product corresponding to the video content. For example, the product content management system 128 may determine that the video content included in the product item video content 530 corresponds to the first product 508 and store the video content in the first product data 506. The product content management system 128 may also store the identifier of the user 502 in the first product data 506, such that the user 502 may be identified as a user of the client application 104 that created video content related to the first product 508. In addition, the product content management system 128 may determine an identifier of the creator of the video content included in the product item video content 530, such as an identifier of the user 502. In these situations, the product content management system 128 may indicate in the first user profile 518 that the first user 502 has created the video content for the first product 508. In various examples, the product content management system 128 may also store profile information of the user 502 in the first product data 506. The product content management system 128 may also store an indicator of a level of privacy for the video content included in the product item video content 530.

Figure 6:
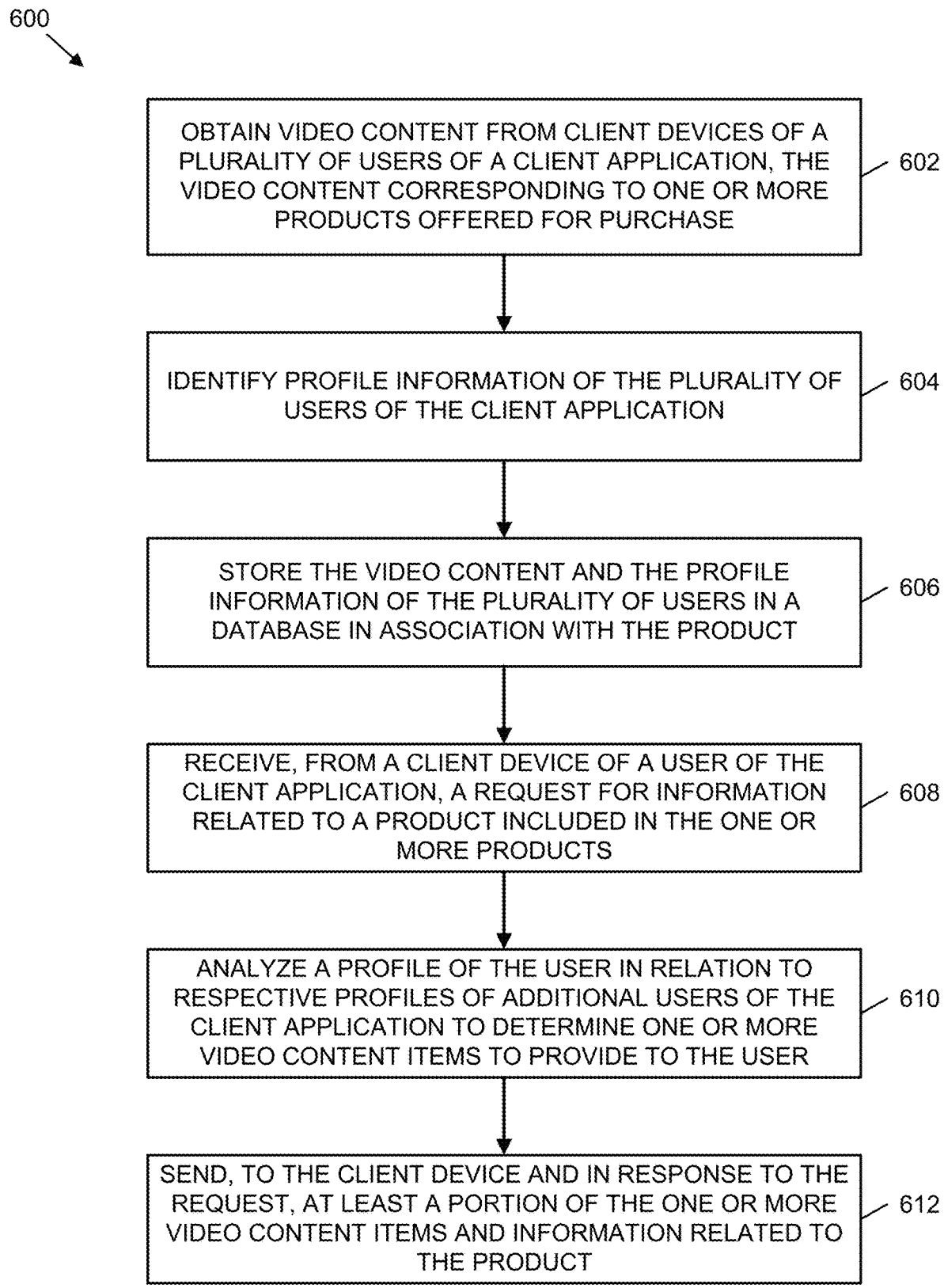
FIG. 6 is a flowchart illustrating example operations performed by a server system for obtaining video content related to a product and providing the video content to a user of a client application according to one or more example implementations.
Figure 7:
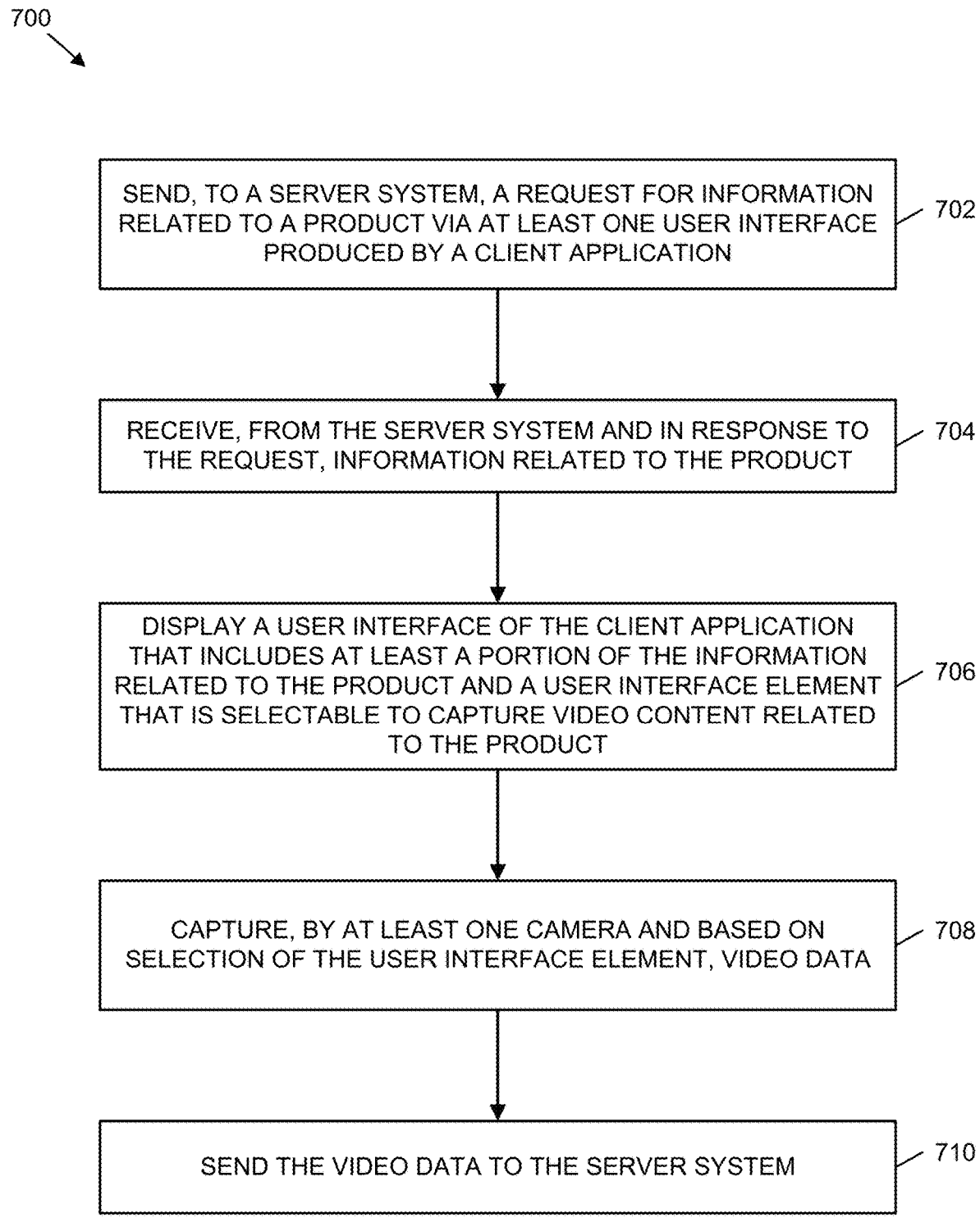
FIG. 7 is a flowchart illustrating example operations performed by a client device to provide video content related to a product to a server system, according to one or more example implementations.

FIGS. 6 and 7 illustrate flowcharts of processes to access and generate video content of products available for purchase via the client application 104 that are created using the client application 104. The processes may be embodied in computer-readable instructions for execution by one or more processors such that the operations of the processes may be performed in part or in whole by the functional components of at least one of the client application 104 or the server system 108. Accordingly, the processes described below are by way of example with reference thereto, in some situations. However, in other implementations, at least some of the operations of the processes described with respect to FIGS. 6 and 7 may be deployed on various other hardware configurations. The processes described with respect to FIGS. 6 and 7 are therefore not intended to be limited to the server system 108 or client device 102 and can be implemented in whole, or in part, by one or more additional components. Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

FIG. 6 is a flowchart illustrating example operations of a process 600 performed by a server system for obtaining video content related to a product and providing the video content to a user of a client application according to one or more example implementations. At operation 602, the process 600 may include obtaining video content from client devices of a plurality of users of a client application. In at least some implementations, the client application may include a messaging application. The video content may correspond to one or more products offered for purchase via the client application. In one or more examples, the video content may correspond to a video review of one or more products. To illustrate, the client application may display respective user interfaces that include information about a number of products and that also include user interface elements that are selectable to initiate financial transactions for users of the client application to purchase the products. The product information included in a user interface corresponding to a product offered for purchase via the client application 104 may include at least one of a name of the product, a description of the product, a price of the product, a seller of the product, a manufacturer of the product, or a rating of the product. Additionally, the product information corresponding to a product may include video content related to the product, such as a video review, instructions related to use of the product, assembly instructions related to the product, or demonstration of use of the product. In one or more illustrative examples, the one or more products may include at least one of cosmetic products or beauty products.

In addition, the process 600 may include, at operation 604, identifying profile information of the plurality of users of the client application that submitted video content corresponding to the product. In one or more examples, individual users of the client application may be associated with a profile that includes information about the respective users. The profile may include information corresponding to at least one of one or more identifiers of a user, one or more locations of the user, product purchase history of the user, video content viewing history of the user, or contacts of the user. At operation 606, the process 600 may include storing video content and the profile information of the plurality of users in a database in association with the product. To illustrate, a data structure storing data corresponding to a video content item generated by a user of the client application may include one or more database elements indicating a product corresponding to the video content, such as an identifier of the product. In various examples, the data structure storing the video content may include a pointer or other link to at least a portion of the profile information of the user that submitted the video content. In this way, a server system may access data related to profiles of users of the client application that created the respective video content items.

Further, at operation 608, the process 600 may include receiving, from a client device of a user of the client application a request for information related to a product included in the one or more products. In one or more implementations, the client application may display a user interface that includes user interface elements that correspond to video content items. The individual user interface elements may be selectable to view a respective video content item. For example, in response to selection of a user interface element related to a video content item, the client application may send a request to the server system to provide video content data to the client device that is related to the video content item corresponding to the selected user interface element.

The process 600 may also include, at operation 610, analyzing profile information of the user in relation to respective profiles of a plurality of additional users of the client application to determine one or more video content items to provide to the user. The server system may analyze profiles of additional users of the client application to determine a level of interest of the user in video content items related to the product. In various examples, a level of interest may refer to an amount of user activity or involvement with respect to a particular product or product segment. In one or more examples, the user may have a relatively higher level of interest in video content items related to the product viewed by additional users of the client application that have characteristics that are similar to characteristics of the user. For example, a comparison of values of one or more characteristics of the user and one or more additional users of the client application may be performed to determine a level of similarity between the user and respective additional users of the client application. In one or more illustrative examples, users living in a same location, users having similar ages, users purchasing similar products, users having similar interests (e.g., based on previous media content viewing history, web browsing history), users having a similar occupation, or one or more combinations thereof, may have relatively higher levels of interest with respect to the user making the request than additional users that do not share characteristics with the user.

In one or more implementations, a level of interest of the user in a video content item or a level of similarity between the user and another user of the client application may be based on level of interest values or level of similarity values between the users. The level of interest values or level of similarity values may follow a schema, such as purchase of a product included in a video content item may be assigned a first score value, viewing a video content item related to the product may be assigned a second score value, and at least one of sharing or posting or creating a video content item related to the product may be assigned a third score value. It is appreciated each score value can be a different value to indicate a relative level of similarity or interest (e.g., greater score value for more significant activity and lower score value for less significant activity). It is further appreciated that other types of scoring approaches can be utilized.

The level of interest of the user in video content items related to the product may also be based on a level of similarity between video content items previously viewed by the user and the video content items related to the product. Additionally, a level of interest of the user in video content items related to the product may be based on video content items previously viewed by contacts of the user. To illustrate, the level of interest of the user in video content items related to the product that were previously viewed by one or more contacts of the user may have a higher level of interest to the user than video content items related to the product that were not viewed by contacts of the user. Further, the user may have a higher level of interest in video content items related to the user that were created by contacts of the user in relation to video content items related to the product that were not created by contacts of the user. The level of interest of the user in one or more video content items related to the product may indicate respective probabilities that the user will select to view the one or more video content items.

In one or more examples, the level of interest of the user in video content items related to the product may be used to rank the video content items. In various examples, video content items having a relatively higher level of interest may have higher rankings. The rankings of the video content items may indicate an order in which the video content items are presented to the user in at least one user interface produced by the client application that includes information about the product. For example, video content items related to the product having a relatively higher ranking may be presented in the user interface before video content items having relatively lower rankings. The rankings of video content items may also be based on a level of expertise or experience of a creator of the video content item within a field that is related to the product. In various examples, video content items created by users of the client application having a greater level of expertise or experience in a field that is related to the product (e.g., cosmetic or beauty products, may be more highly ranked than video content items created by users of the client application with a lower level of expertise or experience in the field. Further, rankings of content items may also be based on at least one of a number of followers that a creator of a video content item has acquired or a creator of a video content item related to the product having a public profile or a public persona.

In one or more implementations, the analysis of the profile of the user in relation to respective profiles of a plurality of additional users of the client application may be performed using at least one of one or more machine learning techniques or one or more statistical techniques. In one or more illustrative examples, the analysis may be performed by determining an amount of similarity between the user and the one or more additional users based on word embedding techniques. In one or more additional examples, the analysis may be performed by generating a network that includes nodes corresponding at least one user of the client application and determining respective distanced within the network of the user with respect to each of the plurality of additional users.

At operation 612, the process 600 may include sending to the client device and in response to the request, at least a portion of the one or more video content items and information related to the product. In one or more implementations, the system may determine video content items satisfying at least a threshold level of interest with respect to the user and include the video content items in the response to the request from the user for information about the product.

FIG. 7 is a flowchart illustrating example operations of a process 700 performed by a client device to provide video content related to a product to a server system, according to one or more example implementations. The process 700 may include, at operation 702, sending, to a server system, a request for information related to a product via at least one user interface produced by a client application. The user interface may include a user interface element that is selectable to request information about the product. In one or more examples, the request may include one or more keywords corresponding to the product. In additional examples, the request may be sent based on selection of a product included in a list of search results that correspond to one or more keywords included in a search request. In further examples, the request may be sent based on selection of a user interface element related to the product that is including in messaging content or social media content of a contact of the user.

At operation 704, the process 700 may include receiving, from the server system and in response to the request, information related to the product. In addition, at operation 706, the process 700 may include displaying a user interface of the client application that includes at least a portion of the information related to the product. To illustrate, the client device may receive data related to a user interface that includes information about the product that may include at least one of video content, image content, pricing information, product description, product ratings, or sellers of the product. The user interface may also include a user interface element that is selectable to capture video content related to the product. For example, the user interface may include a user interface element that is selectable to record a video review of the product.

The process 700 may also include, at operation 708, capturing, by at least one camera and based on selection of the user interface element, video data. In one or more illustrative examples, selection of the user interface element may cause one or more cameras of the client device to activate. In these situations, the client application may produce a view that shows a field of view of the one or more cameras. Additionally, an icon may be present overlaying the field of view that is selectable to record video content being captured by the one or more cameras. After video content related to the product has been recorded, the user of the client application may use one or more tools of the client application to modify the video content to create a modified version of the video content. For example, the user of the client application may add augmented reality content to the video content, such as one more text-containing captions, image content, creative artwork, one or more overlays, or one or more animations. The user may also launch one or more tools of the client application to modify playback characteristics of the video content, such as sound of the video content, playback speed of the video content, or modify one or more additional playback characteristics of the video content.

Further, at operation 710, the process 700 may include sending video data to the server system. The video data may include the video content captured in relation to the product. The video data may also correspond to one or more modifications made to the video content captured in relation to the product. In one or more examples, the video data may be sent to the server system in conjunction with information indicating an audience for the video content. For example, the video data may include or be sent in conjunction with an indication that the video content is to be accessible to contacts of the creator of the video content, such as friends of the creator in relation to the client application or other users of the client application that are included in a social network of the creator. In additional examples, the video data may include or be sent in conjunction with an indication that the video content is to be publicly available and accessible to users of the client application that are outside of the contact group or social network of the creator. In various examples, the creator of the video content may indicate one or more characteristics of users of the client application that may access the video content, such as one or more demographic characteristics, one or more location characteristics, or content consumption history.

Figure 8:
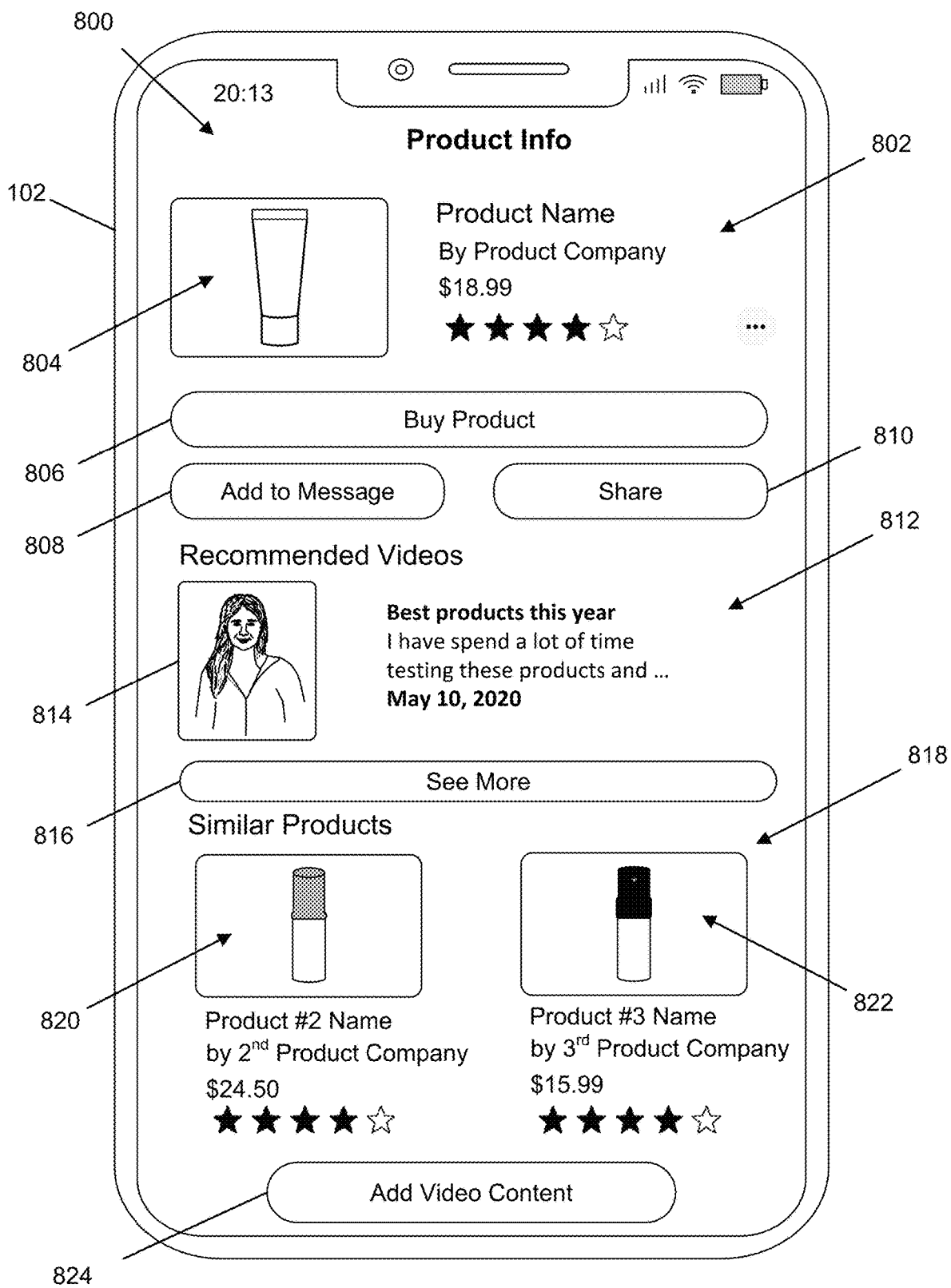
FIG. 8 is an illustration of a user interface that includes video content related to a product, according to one or more example implementations.

FIG. 8 is an illustration of a user interface 800 that includes video content related to a product, according to one or more example implementations. The user interface 800 may be displayed via a display device of the client device 102 and the user interface 800 may include a first section 802 that includes information about a product 804. The first section 802 may indicate a name of the product 804, a seller or manufacturer of the product 804, a price of the product 804, and one or more ratings of the product 804. The first section 802 may also include an image of the product 804. Additionally, the user interface 800 may include a first user interface element 806 that is selectable to initiate a financial transaction to purchase at least one instance of the product 804. Further, the user interface 800 may include a second user interface element 808 that is selectable to compose a message that includes information about the product 804 and a third user interface element 810 that is selectable to share information about the product 804 with contacts of a user of the client device 102.

In the illustrative example of FIG. 8, the user interface 800 may include a second section 812 that includes one or more video content items related to the product 804. For example, the second section 812 may include a fourth user interface element 814 that is selectable to play a video content item related to the product 804. In various examples, the fourth user interface element 814 may include an image that is captured from the video content item. In one or more implementations, the video content item may include a review of the product 804. In addition, the user interface 800 may include a fifth user interface element 816 that is selectable to view additional video content items related to the product 804. The video content items presented via the client application 104 may be displayed in an order that corresponds to a predicted level of interest of a user of the client device 102 in respective video content items. To illustrate, selection of the fifth user interface element 816 may cause an additional user interface to be displayed that includes a number of additional user interface elements that each correspond to different video content items related to the product 804. In these situations, video content items that may have a relatively higher level of interest with respect to the user of the client device 102 may be presented toward a top portion of the collection of video content items with video content items having a lower level of interest with respect to the user of the client device 102 being presented in a lower portion of the collection of video content items.

The user interface 800 may also include a third section 818 that includes information corresponding to additional products offered for purchase via the client application, such as the first additional product 820 and the second additional product 822. The additional products 820, 822 may be related to the product 804, such as products having a same or similar category as the product 804. In further examples, the additional products 820, 822 displayed in the third section 818 may have at least a threshold level of interest for the user of the client device 102. In one or more implementations, the user interface 800 may also include a sixth user interface element 824 that is selectable to capture video content related to the product 804. For example, the sixth user interface element 824 may be selectable to capture a video review related to the product 804.

Figure 9:
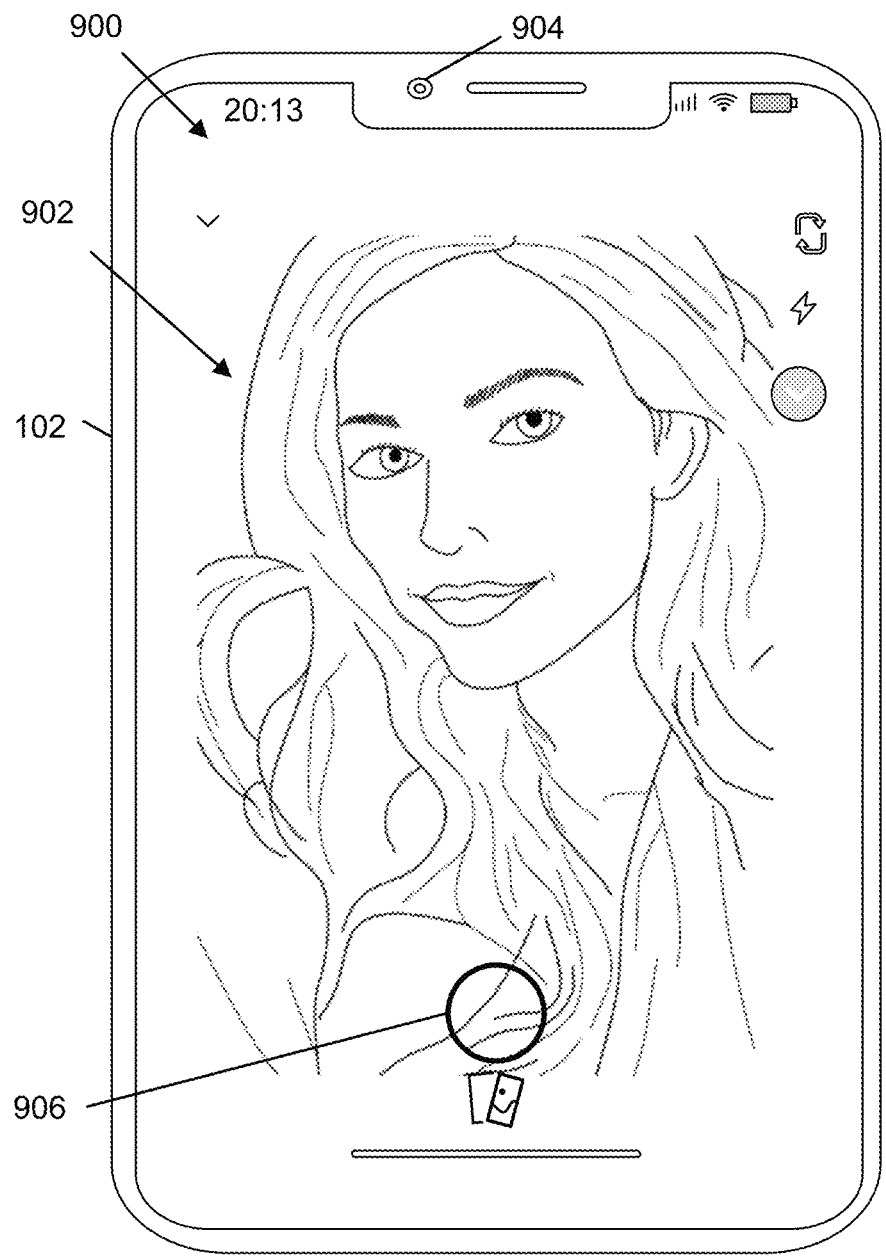
FIG. 9 is an illustration of a user interface to capture video content related to a product, according to one or more example implementations.

FIG. 9 is an illustration of a user interface 900 to capture video content related to a product, according to one or more example implementations. The user interface 900 may be displayed via a display device of the client device 102 and produced by a client application executed by the client device 102, such as the client application 104. In various examples, the user interface 900 may be displayed in response to selection of the sixth user interface element 824 included in the user interface 800. The user interface 900 may include a field of view 902 captured by a camera 904 of the client device 102. In addition, the user interface 900 may include a user interface element 906 that is selectable to record content shown in the view field of 902. For example, the user interface element 906 may be selectable to capture an image shown in the field of view 902. Additionally, the user interface element 906 may be selectable to capture content included in the field of view 902 over a period of time. In this way, the user interface element 906 may be selectable to capture video content that is related to a product.

Figure 10:
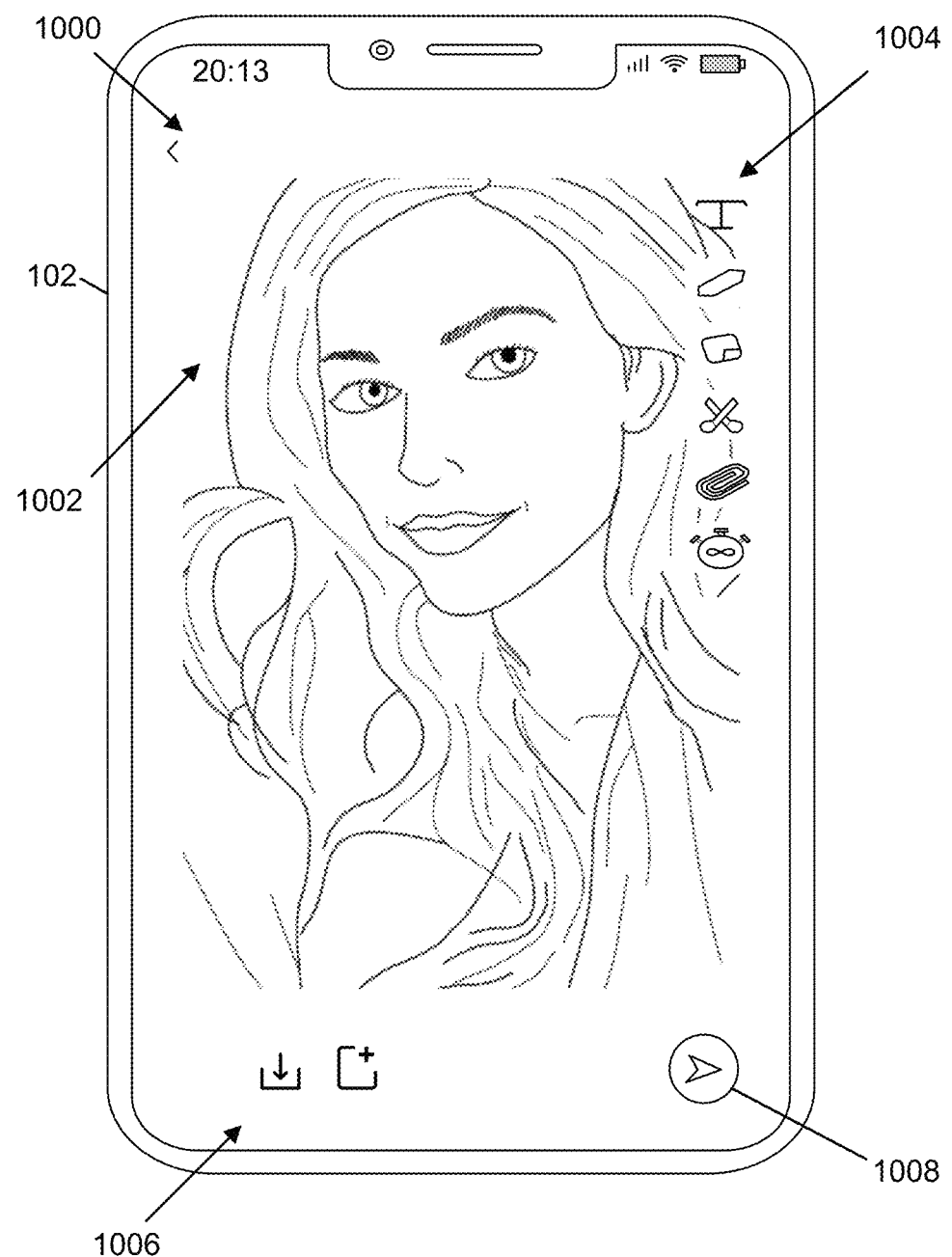
FIG. 10 is an illustration of a user interface to edit video content related to a product using a tool of the client application, according to one or more example implementations.

FIG. 10 is an illustration of a user interface 1000 to edit video content related to a product using a tool of the client application, according to one or more example implementations. The user interface 1000 may be displayed via a display device of the client device 102. In addition, the user interface 1000 may include an image 1002 that may correspond to a portion of video content captured by the client device 102. The user interface 1000 may also include a number of first user interface elements 1004. Each of the first user interface elements 1004 may be selectable to launch a tool of the client application. For example, one of the first user interface elements 1004 may be selectable to add a text overlay to at least a portion of video captured by the client device 102. In addition, another one of the first user interface elements 1004 may be selectable to launch a creative tool that may be used to produce creative art that may overlay at least a portion of the video content captured by the client device 102. The creative art may include words, symbols, images, one or more combinations thereof, and the like that are produced using the creative tool. Further, an additional one of the first user interface elements 1004 may be selectable to add previously produced overlays to at least a portion of the video captured using the client device 102. The previously produced overlays may be generated by at least one of one or more users of the client application or a service provider that maintains and provides the client application. The first user interface elements 1004 may also include one or more user interface elements that are selectable to modify at least one of one or more playback characteristics of video captured by the client device 102 or one or more audio characteristics of audio related to video captured by the client device 102 to produce a modified version of video content based on the initial version of the video captured by the client device 102.

Additionally, the user interface 1000 may include one or more second user interface elements 1006. At least a portion of the second user interface elements 1006 may be selectable to save the initial version or a modified version of the video captured via the client device 102 to one or more collections of content related to the user of the client device 102 that is creating the video content. In various examples, the user interface 1000 may include a third user interface element 1008 that is selectable to share the video content with one or more additional users of the client application.

Figure 11:
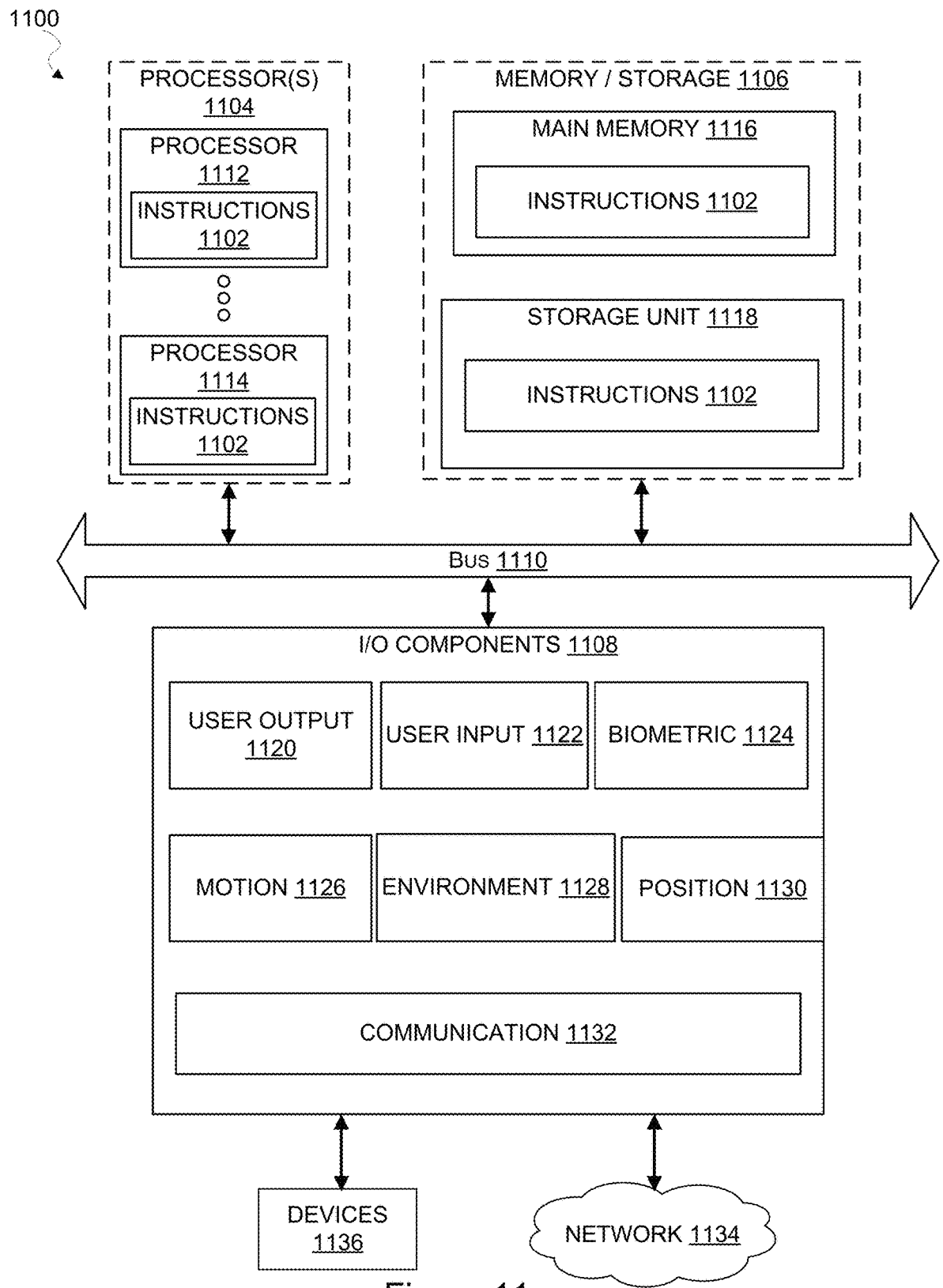
FIG. 11 is a block diagram illustrating components of a machine, in the form of a computer system, that may read and execute instructions from one or more machine-readable media to perform any one or more methodologies described herein, in accordance with one or more example implementations.

FIG. 11 is a block diagram illustrating components of a machine 1100, according to some example implementations, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1102 (e.g., software, a program, an application, an applet, an app, or other executable code) for causing the machine 1100 to perform any one or more of the methodologies discussed herein may be executed. As such, the instructions 1102 may be used to implement modules or components described herein. The instructions 1102 transform the general, non-programmed machine 1100 into a particular machine 1100 programmed to carry out the described and illustrated functions in the manner described. In alternative implementations, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1102, sequentially or otherwise, that specify actions to be taken by machine 1100. Further, while only a single machine 1100 is illustrated, the term "machine" shall also be taken to include a collection of machines that individually or jointly execute the instructions 1102 to perform any one or more of the methodologies discussed herein.

The machine 1100 may include processors 1104, memory/storage 1106, and I/O components 1108, which may be configured to communicate with each other such as via a bus 1110. In an example implementation, the processors 1104 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1112 and a processor 1114 that may execute the instructions 1102. The term "processor" is intended to include multi-core processors 1104 that may comprise two or more independent processors (sometimes referred to as "cores") that may execute instructions 1102 contemporaneously. Although FIG. 16 shows multiple processors 1104, the machine 1100 may include a single processor 1112 with a single core, a single processor 1112 with multiple cores (e.g., a multi-core processor), multiple processors 1112, 1114 with a single core, multiple processors 1112, 1114 with multiple cores, or any combination thereof.

The memory/storage 1106 may include memory, such as a main memory 1116, or other memory storage, and a storage unit 1118, both accessible to the processors 1104 such as via the bus 1110. The storage unit 1118 and main memory 1116 store the instructions 1102 embodying any one or more of the methodologies or functions described herein. The instructions 1102 may also reside, completely or partially, within the main memory 1116, within the storage unit 1118, within at least one of the processors 1104 (e.g., within the processor's cache memory), or any suitable combination thereof, during execution thereof by the machine 1100. Accordingly, the main memory 1116, the storage unit 1118, and the memory of processors 1104 are examples of machine-readable media.

The I/O components 1108 may include a wide variety of components to receive input, provide output, produce output, transmit information, exchange information, capture measurements, and so on. The specific I/O components 1108 that are included in a particular machine 1100 will depend on the type of machine. For example, portable machines such as mobile phones will likely include a touch input device or other such input mechanisms, while a headless server machine will likely not include such a touch input device. It will be appreciated that the I/O components 1108 may include many other components that are not shown in FIG. 11. The I/O components 1108 are grouped according to functionality merely for simplifying the following discussion and the grouping is in no way limiting. In various example implementations, the I/O components 1108 may include user output components 1120 and user input components 1122. The user output components 1120 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1122 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location or force of touches or touch gestures, or other tactile input components), audio input components (e.g., a microphone), and the like.

In further example implementations, the I/O components 1108 may include biometric components 1124, motion components 1126, environmental components 1128, or position components 1130 among a wide array of other components. For example, the biometric components 1124 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1126 may include acceleration sensor components (e.g., accelerometer), gravitation sensor components, rotation sensor components (e.g., gyroscope), and so forth. The environmental components 1128 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1130 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1108 may include communication components 1132 operable to couple the machine 1100 to a network 1134 or devices 1136. For example, the communication components 1132 may include a network interface component or other suitable device to interface with the network 1134. In further examples, communication components 1132 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1136 may be another machine 1100 or any of a wide variety of peripheral devices (e.g., a peripheral device coupled via a USB).

Moreover, the communication components 1132 may detect identifiers or include components operable to detect identifiers. For example, the communication components 1132 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1132, such as location via Internet Protocol (IP) geo-location, location via Wi-Fi® signal triangulation, location via detecting an NFC beacon signal that may indicate a particular location, and so forth.

Figure 12:
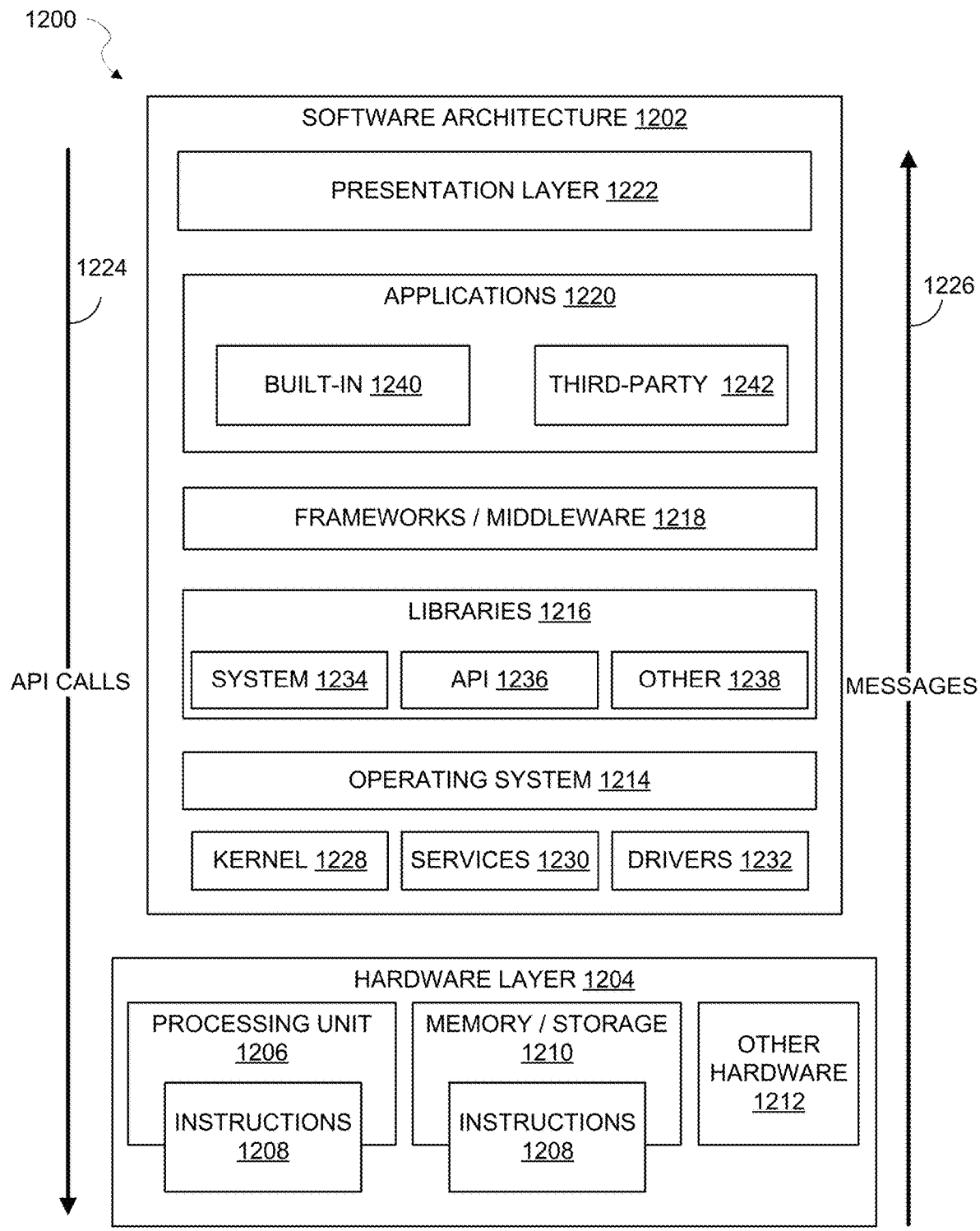
FIG. 12 is block diagram illustrating a representative software architecture that may be used in conjunction with one or more hardware architectures described herein, in accordance with one or more example implementations.

FIG. 12 is a block diagram illustrating system 1200 that includes an example software architecture 1202, which may be used in conjunction with various hardware architectures herein described. FIG. 12 is a non-limiting example of a software architecture and it will be appreciated that many other architectures may be implemented to facilitate the functionality described herein. The software architecture 1202 may execute on hardware such as machine 1100 of FIG. 11 that includes, among other things, processors 1104, memory/storage 1106, and input/output (I/O) components 1108. A representative hardware layer 1204 is illustrated and can represent, for example, the machine 1100 of FIG. 11. The representative hardware layer 1204 includes a processing unit 1206 having associated executable instructions 1208. Executable instructions 1208 represent the executable instructions of the software architecture 1202, including implementation of the methods, components, and so forth described herein. The hardware layer 1204 also includes at least one of memory or storage modules memory/storage 1210, which also have executable instructions 1208. The hardware layer 1204 may also comprise other hardware 1512.

In the example architecture of FIG. 12, the software architecture 1202 may be conceptualized as a stack of layers where each layer provides particular functionality. For example, the software architecture 1202 may include layers such as an operating system 1214, libraries 1216, frameworks/middleware 1218, applications 1220, and a presentation layer 1222. Operationally, the applications 1220 or other components within the layers may invoke API calls 1224 through the software stack and receive messages 1226 in response to the API calls 1224. The layers illustrated are representative in nature and not all software architectures have all layers. For example, some mobile or special purpose operating systems may not provide a frameworks/middleware 1218, while others may provide such a layer. Other software architectures may include additional or different layers.

The operating system 1214 may manage hardware resources and provide common services. The operating system 1214 may include, for example, a kernel 1228, services 1230, and drivers 1232. The kernel 1228 may act as an abstraction layer between the hardware and the other software layers. For example, the kernel 1228 may be responsible for memory management, processor management (e.g., scheduling), component management, networking, security settings, and so on. The services 1230 may provide other common services for the other software layers. The drivers 1232 are responsible for controlling or interfacing with the underlying hardware. For instance, the drivers 1232 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1216 provide a common infrastructure that is used by at least one of the applications 1220, other components, or layers. The libraries 1216 provide functionality that allows other software components to perform tasks in an easier fashion than to interface directly with the underlying operating system 1214 functionality (e.g., kernel 1228, services 1230, drivers 1232). The libraries 1216 may include system libraries 1234 (e.g., C standard library) that may provide functions such as memory allocation functions, string manipulation functions, mathematical functions, and the like. In addition, the libraries 1216 may include API libraries 1236 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 1216 may also include a wide variety of other libraries 1238 to provide many other APIs to the applications 1220 and other software components/modules.

The frameworks/middleware 1218 (also sometimes referred to as middleware) provide a higher-level common infrastructure that may be used by the applications 1220 or other software components/modules. For example, the frameworks/middleware 1218 may provide various graphical user interface functions, high-level resource management, high-level location services, and so forth. The frameworks/middleware 1218 may provide a broad spectrum of other APIs that may be utilized by the applications 1220 or other software components/modules, some of which may be specific to a particular operating system 1214 or platform.

The applications 1220 include built-in applications 1240 and third-party applications 1242. Examples of representative built-in applications 1240 may include, but are not limited to, a contacts application, a browser application, a book reader application, a location application, a media application, a messaging application, or a game application. Third-party applications 1242 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1242 may invoke the API calls 1224 provided by the mobile operating system (such as operating system 1214) to facilitate functionality described herein.

The applications 1220 may use built-in operating system functions (e.g., kernel 1228, services 1230, drivers 1232), libraries 1216, and frameworks/middleware 1218 to create UIs to interact with users of the system. Alternatively, or additionally, in some systems, interactions with a user may occur through a presentation layer, such as presentation layer 1222. In these systems, the application/component "logic" can be separated from the aspects of the application/component that interact with a user.

Glossary

"CARRIER SIGNAL," in this context, refers to any intangible medium that is capable of storing, encoding, or carrying transitory or non-transitory instructions 1102 for execution by the machine 1100, and includes digital or analog communications signals or other intangible medium to facilitate communication of such instructions 1102. Instructions 1102 may be transmitted or received over the network 110, 1134 using a transitory or non-transitory transmission medium via a network interface device and using any one of a number of well-known transfer protocols.

"CLIENT DEVICE," in this context, refers to any machine 1100 that interfaces to a communications network 110, 1134 to obtain resources from one or more server systems or other client devices 102. A client device 102 may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network 110, 1134.

"COMMUNICATIONS NETWORK," in this context, refers to one or more portions of a network 110, 1134 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 110, 1134 or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE," in this context, refers to a message that is accessible for a time-limited duration. An ephemeral message may be a text, an image, a video, and the like. The access time for the ephemeral message may be set by the message sender. Alternatively, the access time may be a default setting, or a setting specified by the recipient. Regardless of the setting technique, the message is transitory.

"MACHINE-READABLE MEDIUM," in this context, refers to a component, device, or other tangible media able to store instructions 1102 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database, or associated caches and servers) able to store instructions 1102. The term "machine-readable medium" shall also be taken to include any medium, or combination of multiple media, that is capable of storing instructions 1102 (e.g., code) for execution by a machine 1100, such that the instructions 1102, when executed by one or more processors 1104 of the machine 1100, cause the machine 1100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT," in this context, refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example implementations, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor 1104 or other programmable processor. Once configured by such software, hardware components become specific machines (or specific components of a machine 1100) uniquely tailored to perform the configured functions and are no longer general-purpose processors 1104. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering implementations in which hardware components are temporarily configured (e.g., programmed), each of the hardware components need not be configured or instantiated at any one instance in time. For example, where a hardware component comprises a general-purpose processor 1104 configured by software to become a special-purpose processor, the general-purpose processor 1104 may be configured as respectively different special-purpose processors (e.g., comprising different hardware components) at different times. Software accordingly configures a particular processor 1112, 1114 or processors 1104, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In implementations in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors 1104 that are temporarily configured (e.g., by software) or permanently configured to perform the relevant operations. Whether temporarily or permanently configured, such processors 1104 may constitute processor-implemented components that operate to perform one or more operations or functions described herein. As used herein, "processor-implemented component" refers to a hardware component implemented using one or more processors 1104. Similarly, the methods described herein may be at least partially processor-implemented, with a particular processor 1112, 1114 or processors 1104 being an example of hardware. For example, at least some of the operations of a method may be performed by one or more processors 1104 or processor-implemented components. Moreover, the one or more processors 1104 may also operate to support performance of the relevant operations in a "cloud computing" environment or as a "software as a service" (SaaS). For example, at least some of the operations may be performed by a group of computers (as examples of machines 1100 including processors 1104), with these operations being accessible via a network 110 (e.g., the Internet) and via one or more appropriate interfaces (e.g., an API). The performance of certain of the operations may be distributed among the processors, not only residing within a single machine 1100, but deployed across a number of machines. In some example implementations, the processors 1104 or processor-implemented components may be located in a single geographic location (e.g., within a home environment, an office environment, or a server farm). In other example implementations, the processors 1104 or processor-implemented components may be distributed across a number of geographic locations.

"PROCESSOR," in this context, refers to any circuit or virtual circuit (a physical circuit emulated by logic executing on an actual processor 1104) that manipulates data values according to control signals (e.g., "commands," "op codes," "machine code," etc.) and which produces corresponding output signals that are applied to operate a machine 1100. A processor 1104 may, for example, be a CPU, a RISC processor, a CISC processor, a GPU, a DSP, an ASIC, a RFIC or any combination thereof. A processor 1104 may further be a multi-core processor having two or more independent processors 1104 (sometimes referred to as "cores") that may execute instructions 1102 contemporaneously.

"TIMESTAMP," in this context, refers to a sequence of characters or encoded information identifying when a certain event occurred, for example giving date and time of day, sometimes accurate to a small fraction of a second.

Changes and modifications may be made to the disclosed implementations without departing from the scope of the present disclosure. These and other changes or modifications are intended to be included within the scope of the present disclosure, as expressed in the following claims.

What is claimed is:

1. A method comprising:
    receiving, by one or more computing devices of a server system, video content from client devices of a plurality of first users, each first user of the plurality of first users being a respective user of a client application, the video content including a plurality of video content items that correspond to one or more products offered for purchase via the client application;
    identifying, by the one or more computing devices, profile information of each of the plurality of first users of the client application;
    storing, by the one or more computing devices, the profile information of the plurality of first users and the video content in a database in association with the one or more products, the database further including product data related to each product of the one or more products;
    receiving, by the one or more computing devices, a request for information related to a product included in the one or more products, the request corresponding to a user of the client application;
    analyzing, by the one or more computing devices, a first profile of the user in relation to one or more second profiles of one or more second users of the client application to determine one or more video content items included in the plurality of video content items to provide to the user;
    sending, by the one or more computing devices, a response to the request to a client device of the user, the response including user interface data for a user interface that is dedicated to the product and includes at least a portion of the one or more video content items and product data that is related to the product and stored by the database;
    causing, by the one or more computing devices, presentation of the user interface at a display device, the user interface including a user interface element that is selectable to display an additional user interface;
    causing, by the one or more computing devices, presentation of the additional user interface, the additional user interface including a video content item and an additional user interface element that is selectable to activate one or more functions of a creative tool to generate a modified version of the video content item that includes an augmented reality content item that at least one of overlays the video content item or modifies one or more characteristics of the video content item; and
    storing, by the one or more computing devices, the modified version of the video content item in the database in association with the product.

2. The method of claim 1, further comprising:
    performing, by the one or more computing devices, an analysis of one or more first values of one or more characteristics included in the first profile of the user in relation to one or more second values of the one or more characteristics included in a second profile of the one or more second profiles corresponding to a second user of the one or more second users of the client application, the second user being related to the product;
    determining, by the one or more computing devices, a level of interest of the user in a video content item of the one or more video content items based on the analysis; and
    determining, by the one or more computing devices and based on the level of interest, that the video content item is to be included in the response to the request.

3. The method of claim 2, wherein the analysis includes:
    performing, by the one or more computing devices, a comparison between the one or more first values and the one or more second values;
    determining, by the one or more computing devices and based on the comparison, a measure of similarity between the one or more first values and the one or more second values; and
    wherein the level of interest of the user in the one or more video content items corresponds to the measure of similarity.

4. The method of claim 2, wherein the second user created the video content item or the second user viewed the video content item.

5. The method of claim 2, further comprising:
    determining, by the one or more computing devices, a ranking of the video content item with respect to the user in relation to the plurality of video content items, wherein the ranking is based on the level of interest of the user with respect to the video content in relation to additional levels of interest of the user with respect to one or more additional video content items included in the plurality of video content items.

6. The method of claim 5, further comprising:
    determining, by the one or more computing devices, an order in which to present the video content item in a user interface displayed via the client application, the user interface including at least a portion of product data and the video content item.

7. The method of claim 6, wherein the user interface includes a user interface element that is selectable to purchase the product; and
    further comprising:
    receiving, by the one or more computing devices, an indication from the client device to purchase the product based on selection of the user interface element; and
    initiating, by the one or more computing devices, a financial transaction for the user to purchase the product.

8. The method of claim 2, further comprising:
    determining, by the one or more computing devices, that the second user has a social networking connection with the user; and
    wherein the level of interest of the user in the video content item is based on the second user having a social networking connection with the user.

9. The method of claim 2, wherein the level of interest is based on at least one of the video content item being in a same category or a similar category as the product or the video content item being in a same category or a similar category as additional video content items viewed by the user.

10. The method of claim 1, wherein:
the client application is a messaging application,
the one or more products include one or more cosmetic products; and
the video content includes one or more overlays, the one or more overlays including at least one of text content that overlays at least a portion of the video content, image content that overlays at least a portion of the video content, or augmented reality content that overlays at least a portion of the video content and is produced by one or more tools of the messaging application.

11. A system comprising:
one or more hardware processors; and
one or more non-transitory computer-readable storage media including computer-readable instructions that, when executed by the one or more hardware processors, cause the one or more hardware processors to perform operations comprising:
receiving video content from client devices of a plurality of first users, each first user of the plurality of first users being a respective user of a client application, the video content including a plurality of video content items that correspond to one or more products offered for purchase via the client application;
identifying profile information of each of the plurality of first users of the client application;
storing the profile information of the plurality of first users and the video content in a database in association with the one or more products, the database further including product data related to each product of the one or more products;
receiving a request for information related to a product included in the one or more products, the request corresponding to a user of the client application;
analyzing a first profile of the user in relation to one or more second profiles of one or more second users of the client application to determine one or more video content items included in the plurality of video content items to provide to the user;
sending a response to the request to a client device of the user, the response including user interface data for a user interface that is dedicated to the product and includes at least a portion of the one or more video content items and product data that is related to the product and stored by the database; and
causing presentation of the user interface at a display device, the user interface including a user interface element that is selectable to display an additional user interface;
causing presentation of the additional user interface, the additional user interface including a video content item and an additional user interface element that is selectable to activate one or more functions of a creative tool to generate a modified version of the video content item that includes an augmented reality content item that at least one of overlays the video content item or modifies one or more characteristics of the video content item; and
storing the modified version of the video content item in the database in association with the product.

12. The system of claim 11, wherein the one or more non-transitory computer-readable storage media include additional computer-readable instructions that, when executed by the one or more hardware processors, cause the one or more hardware processors to perform additional operations comprising:
performing an analysis with respect to one or more characteristics of one or more additional video content items viewed by the user in relation to one or more characteristics of a video content item of the one or more video content items; and
determining, based on the analysis, a level of interest for the user with respect to the video content item.

13. The system of claim 12, wherein the one or more non-transitory computer-readable storage media include additional computer-readable instructions that, when executed by the one or more hardware processors, cause the one or more hardware processors to perform additional operations comprising:
determining that the level of interest satisfies a threshold level of interest; and
determining, based on the level of interest satisfying the threshold level of interest, that the video content item is to be included in the response to the request.

14. The system of claim 11, wherein the user interface includes a user interface element that is selectable to capture additional video content related to the product.

15. The system of claim 11, wherein the one or more non-transitory computer-readable storage media include additional computer-readable instructions that, when executed by the one or more hardware processors, cause the one or more hardware processors to perform additional operations comprising:
obtaining video content data from the client device of the user, the video content data including a video review of the product captured via the client application; and
storing the video review of the product in association with additional video reviews of the product.

16. The system of claim 15, wherein the one or more non-transitory computer-readable storage media include additional computer-readable instructions that, when executed by the one or more hardware processors, cause the one or more hardware processors to perform additional operations comprising:
receiving, from the client device of the user, an additional request to share the video review with one or more recipients, the one or more recipients being additional users of the client application; and
sending, based on the additional request, a message to an additional client device of a recipient of the one or more recipients, the message including the video review and being accessible via the client application.

17. The system of claim 15, wherein the one or more non-transitory computer-readable storage media include additional computer-readable instructions that, when executed by the one or more hardware processors, cause the one or more hardware processors to perform additional operations comprising:
receiving, from the client device of the user, an additional request to store the video review in association with a collection of content corresponding to the user, the collection of content being accessible to one or more social networking connections of the user via the client application.

18. One or more non-transitory computer-readable storage media including computer-readable instructions that, when executed by one or more hardware processors, cause the one or more hardware processors to perform operations comprising:

receiving video content from client devices of a plurality of first users, each first user of the plurality of first users being a respective user of a client application, the video content including a plurality of video content items that correspond to one or more products offered for purchase via the client application;

identifying profile information of each of the plurality of first users of the client application;

storing the profile information of the plurality of first users and the video content in a database in association with the one or more products, the database further including product data related to each product of the one or more products;

receiving a request for information related to a product included in the one or more products, the request corresponding to a user of the client application;

analyzing a first profile of the user in relation to one or more second profiles of one or more second users of the client application to determine one or more video content items included in the plurality of video content items to provide to the user;

sending a response to the request to a client device of the user, the response including user interface data for a user interface that is dedicated to the product and includes at least a portion of the one or more video content items and product data that is related to the product and stored by the database; and causing presentation of the user interface at a display device, the user interface including a user interface element that is selectable to display an additional user interface;

causing presentation of the additional user interface, the additional user interface including a video content item and an additional user interface element that is selectable to activate one or more functions of a creative tool to generate a modified version of the video content item that includes an augmented reality content item that at least one of overlays the video content item or modifies one or more characteristics of the video content item; and storing the modified version of the video content item in the database in association with the product.

19. The one or more non-transitory computer-readable storage media of claim 18, including additional computer-readable instructions that, when executed by the one or more hardware processors, cause the one or more hardware processors to perform additional operations comprising:

determining a level of privacy corresponding to a video content item of the plurality of video content items based on a privacy setting stored in association with the video content item, the privacy setting indicating an audience for the video content item;

determining that the user is included in the audience for the video content item; and determining that the video content item is included in the response sent to the client device based on the user being included in the audience for the video content item.

20. The one or more non-transitory computer-readable storage media of claim 18, including additional computer-readable instructions that, when executed by the one or more hardware processors, cause the one or more hardware processors to perform additional operations comprising:

determining that the modified version of the video content item corresponds to an additional request for information related to the product received from an additional user of the client application; and causing the modified version of the video content item to be displayed in a further user interface displayed on a display device of a client device of the additional user.

* * * * *